US011809983B2

(12) United States Patent
Long et al.

(10) Patent No.: US 11,809,983 B2
(45) Date of Patent: Nov. 7, 2023

(54) MACHINE-LEARNING-BASED DIGITAL SURVEY CREATION AND MANAGEMENT

(71) Applicant: Qualtrics, LLC, Provo, UT (US)

(72) Inventors: Ryan Long, Lehi, UT (US); Johnny Russ, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 1382 days.

(21) Appl. No.: 16/117,918

(22) Filed: Aug. 30, 2018

(65) Prior Publication Data
US 2020/0074294 A1 Mar. 5, 2020

(51) Int. Cl.
G06N 3/08 (2023.01)
G06F 40/30 (2020.01)
G06F 40/247 (2020.01)
G06F 40/279 (2020.01)
G06N 3/044 (2023.01)
G06F 3/0482 (2013.01)

(52) U.S. Cl.
CPC ............. *G06N 3/08* (2013.01); *G06F 40/247* (2020.01); *G06F 40/279* (2020.01); *G06F 40/30* (2020.01); *G06N 3/044* (2023.01); *G06F 3/0482* (2013.01)

(58) Field of Classification Search
CPC ...... G06N 3/08; G06N 3/0445; G06F 40/279; G06F 40/247; G06F 40/30; G06F 3/0482
See application file for complete search history.

(56) References Cited

U.S. PATENT DOCUMENTS

| | | | | |
|---|---|---|---|---|
| 2015/0381552 A1* | 12/2015 | Vijay | ................... | H04L 67/306 709/206 |
| 2016/0042370 A1* | 2/2016 | Ludwig | .............. | G06Q 30/0203 705/7.32 |
| 2017/0249371 A1* | 8/2017 | Krupa | ..................... | G06Q 10/10 |
| 2017/0337477 A1* | 11/2017 | Barbosa | .............. | G06F 16/3329 |
| 2018/0122256 A1* | 5/2018 | Smith | ....................... | G09B 7/06 |
| 2018/0150607 A1* | 5/2018 | MacLeod | ............... | G16H 10/20 |
| 2018/0158004 A1* | 6/2018 | Davar | ................ | G06Q 10/0637 |
| 2018/0330802 A1* | 11/2018 | Sharifi Sedeh | ........ | G16H 10/60 |
| 2018/0357240 A1* | 12/2018 | Miller | ............... | G06F 16/24578 |
| 2019/0057414 A1* | 2/2019 | Taylor | ............... | G06Q 30/0203 |
| 2019/0110728 A1* | 4/2019 | Sbodio | ..................... | G09B 7/00 |
| 2019/0378618 A1* | 12/2019 | Lieberman | ............. | G06N 20/00 |
| 2020/0042577 A1* | 2/2020 | Kasa | ..................... | G06F 40/166 |

OTHER PUBLICATIONS

Shvartzshnaider et al., "Learning privacy expectations by crowdsourcing contextual informational norms." In Proceedings of the AAAI Conference on Human Computation and Crowdsourcing, vol. 4, pp. 209-218. 2016. (Year: 2016).*

* cited by examiner

Primary Examiner — Frank D Mills
(74) Attorney, Agent, or Firm — Keller Preece PLLC

(57) ABSTRACT

This disclosure relates to methods, non-transitory computer readable media, and systems that use machine-learning techniques to facilitate the creation, timing of distribution, or follow-up actions for digital surveys. In one such implementation, the disclosed methods, non-transitory computer readable media, and systems use a survey-creation-machine learner to generate suggested survey questions for an administrator designing a digital survey. Additionally, in some implementations, the disclosed methods, non-transitory computer readable media, and systems use specialized machine learners to suggest timeframes in which to send digital surveys or to suggest action items to follow up on responses to the survey questions.

20 Claims, 14 Drawing Sheets

MACHINE-LEARNING-BASED DIGITAL SURVEY CREATION AND MANAGEMENT

BACKGROUND

Companies, research institutions, and other organizations increasingly create and distribute digital surveys to gather information about employees, products, services, and other interests. Digital surveys continue to gain popularity among organizations in part because potential survey recipients increasingly have access to personal computers, mobile devices, and other computing devices that facilitate receiving and responding to digital surveys. To capitalize on the increased access to digital surveys, some organizations engage outside firms with survey methodologists or use digital survey systems to create and distribute digital surveys.

Some conventional digital survey systems present technical obstacles to an organization creating and managing a digital survey. For example, conventional digital survey systems often lack computational tools and interfaces to compensate for an organization's lack of experience in generating and distributing an effective digital survey. In particular, conventional digital survey systems often rely on a user within an organization to generate both question and answer content for each question and to distribute and manage follow-up actions for such surveys. Because conventional digital survey systems often lack computational tools and interfaces to guide inexperienced users, many conventional digital survey systems ultimately provide a digital survey that cannot evaluate strategic goals or measure value propositions.

Conventional digital survey systems also often facilitate inexperienced users in creating digital surveys that generate unreliable, un-actionable, less than desirable, or incorrect survey response data. For example, many users of conventional digital survey systems provide a question format or question wording that is confusing or ambiguous, which in turn generates unreliable survey response data. By facilitating unreliable survey response data, conventional digital survey systems often result in an organization using unreliable, incomplete, or even incorrect survey response data to make strategic decisions or evaluate value propositions.

Accordingly, these and other computational voids decrease the utility and flexibility of conventional systems and methods for providing digital surveys.

SUMMARY

This disclosure describes methods, non-transitory computer readable media, and systems that solve the foregoing problems in addition to providing other benefits. For example, in some embodiments, the disclosed systems use machine-learning techniques to facilitate the creation, timing of distribution, or follow-up actions for digital surveys. In one such implementation, the disclosed systems use a survey-creation-machine learner to generate suggested survey questions for an administrator designing a digital survey. Additionally, in some implementations, the disclosed systems use specialized machine learners to suggest timeframes in which to send digital surveys or to suggest action items to follow up on responses to the survey questions.

For instance, in some embodiments, the disclosed systems receive user input from an administrator device to create an initial survey question. The disclosed systems use a survey-creation-machine learner to identify textual features of the initial survey question and to select a representative survey question based on the identified features. Based on the representative survey question, the systems use the survey-creation-machine learner to determine a suggested survey question. The disclosed systems then provide the suggested survey question for display within a graphical user interface of the administrator device.

The disclosed systems avoid the technical deficiencies of conventional digital survey systems. By using a survey-creation-machine learner to analyze and extract textual features from initial survey questions, the disclosed systems detect textual features within survey questions that conventional computer systems could not detect. Moreover, the disclosed system's survey-creation-machine learner determines relationships and correlations that align the previously undetectable textual features with suggested survey questions. Accordingly, unlike the rigidity of some conventional digital survey systems lacking computational tools, in some implementations, the disclosed system's survey-creation-machine learner creates a more flexible analysis of user created questions to provide selectable options that automate the addition of multiple suggested survey questions relating to a survey category.

BRIEF DESCRIPTION OF THE DRAWINGS

The detailed description refers to the drawings briefly described below.

DETAILED DESCRIPTION

Figure 1:
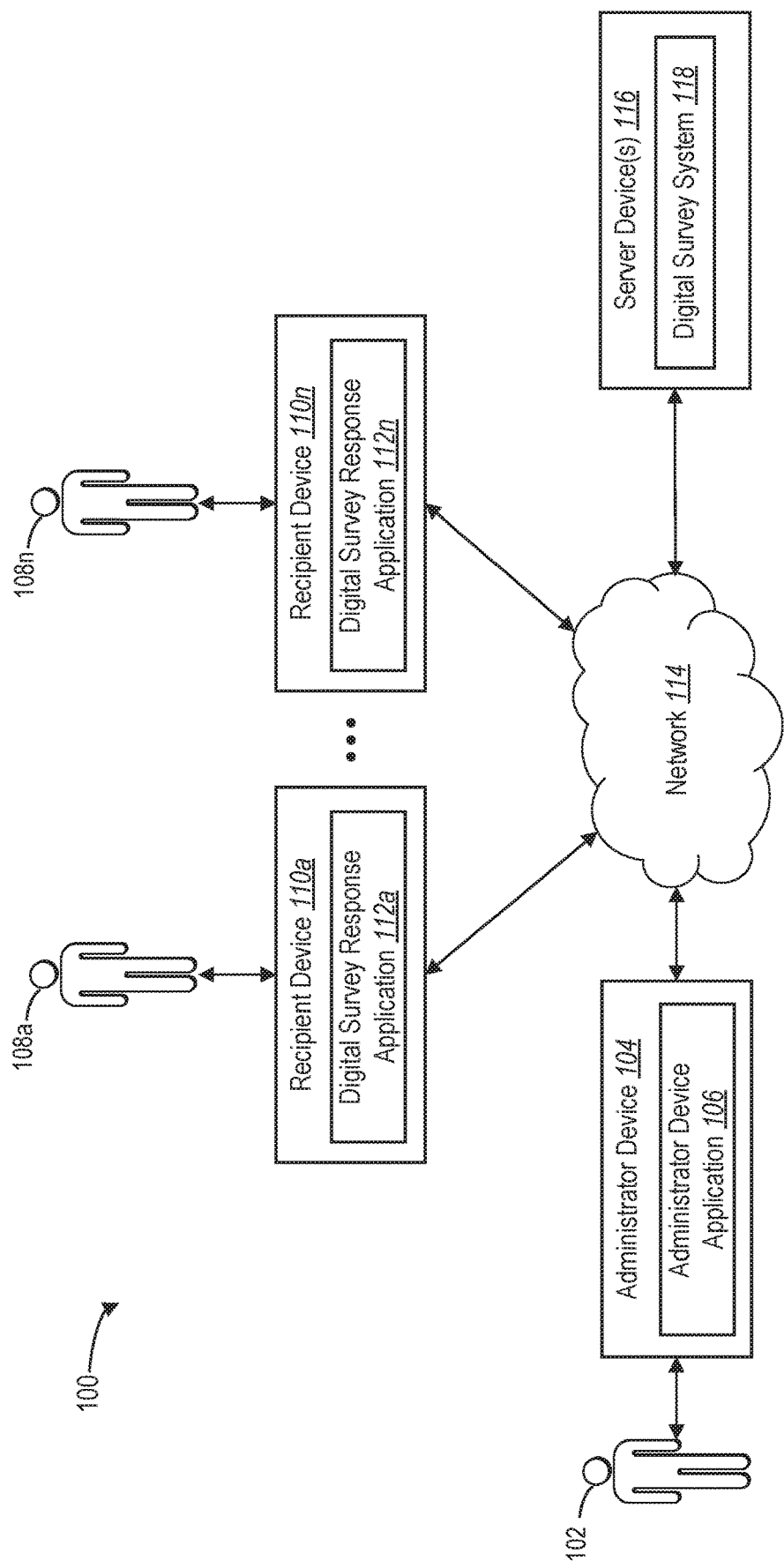
FIG. 1 illustrates a block diagram of an environment in which a digital survey system can operate in accordance with one or more embodiments.

This disclosure describes embodiments of a digital survey system that uses machine-learning techniques to determine suggested survey questions, suggested timeframes for distribution of digital surveys, or suggested follow-up actions for digital surveys. In some implementations, for instance, the digital survey system uses a survey-creation-machine learner to generate suggested survey questions to provide to an administrator device associated with an administrator that provides user input to design a digital survey. Additionally, in some implementations, the digital survey system uses specialized machine learners to suggest timeframes for sending digital surveys that capture a highest predicted response rate or to suggest action items to follow up on responses to survey questions.

For instance, in some embodiments, the digital survey system receives user input from an administrator device to create an initial survey question. The digital survey system subsequently uses a survey-creation-machine learner to identify textual features of the initial survey question and to select a representative survey question based on the identified textual features. Based on the representative survey question, the digital survey system uses the survey-creation-machine learner to determine a suggested survey question. The digital survey system then provides the suggested survey question for display within a graphical user interface of the administrator device along with a selectable option to include the suggested survey question in the digital survey.

When identifying textual features of an initial survey question, the survey-creation-machine learner may analyze or extract a variety of textual features as a precursor to selecting a representative survey question for the initial survey question. For instance, in some implementations, the survey-creation-machine learner extracts terms from the initial survey question and identifies the terms (or synonymous terms) within a representative survey question—from among candidate-representative-survey questions. As another example, in some cases, the survey-creation-machine learner determines an intent of the initial survey question and identifies a representative survey question with a reciprocal intent, such as a reciprocal intent that matches the initial survey question's intent as indicated by natural-language processing.

As noted above, in certain embodiments, the digital survey system provides selectable options for suggested survey questions that correspond to a survey category. For instance, when the digital survey system receives an indication of a selection of a selectable option for a suggested survey question, the digital survey system optionally identifies and provides more suggested survey questions corresponding to the same survey category to the administrator device. Such survey-category-based options facilitate quickly creating a digital survey based on the survey-creation-machine learner's analysis.

When training and implementing the survey-creation-machine learner, the digital survey system may use one or several machine-learning models. For example, in some instances, the digital survey system uses a recursive neural network trained to identify textual similarity between survey questions or to determine intent of survey questions. As another example, in some embodiments, the digital survey system uses a recurrent neural network ("RNN") or a Naïve Bayes Support Vector Machine ("NBSVM") to categorize or determine the intent of survey questions.

As noted above, in addition (or in the alternative) to using a machine learner to suggest survey questions, in some embodiments, the digital survey system uses a survey-timeframe-machine learner to determine a suggested timeframe in which to send survey questions. For instance, in certain implementations, the digital survey system receives multiple inputs from an administrator device—including demographic indicators for target survey recipients, a recipient location for the target survey recipients, and a time range in which to send the target survey recipients survey questions. The digital survey system then uses a survey-timeframe-machine learner to determine (from within the time range) a suggested timeframe in which to send the survey questions to the target survey recipients.

In determining the suggested timeframe, in certain implementations, the survey-timeframe-machine learner identifies the timeframe corresponding to a highest predicted response rate from the target survey recipients. The digital survey system then provides the suggested timeframe for display within a graphical user interface of the administrator device. In some cases, the digital survey system provides a suggested timeframe that corresponds to the suggested survey question recommended by the survey-creation-machine learner.

To identify the suggested timeframe, in some cases, the digital survey system determines weighted response rates for multiple survey clusters of responses from prior survey recipients who received digital surveys in different timeframes and who correspond to the received demographic indicators. To optimize the suggested timeframe, the digital survey system trains the survey-timeframe-machine learner to adjust machine-learning parameters for different timeframes to accurately predict the timeframe in which response rates for the target survey recipients may be highest. For instance, such machine-learning parameters may be weights corresponding to a particular day, week, or month of a year.

As suggested above, in some cases, the digital survey system uses a suggested-action-machine learner to determine a suggested action item for a response to a survey question. For instance, in certain implementations, the digital survey system provides survey questions to recipient devices associated with recipients. The digital survey system then uses a suggested-action-machine learner to determine a suggested action item based on responses to the survey question from one or more recipients. As part of an ongoing feedback cycle, in some cases, the digital survey system may further use the suggested-action-machine learner to suggest another action item for the recipient's response to the suggested action item.

To determine an appropriate suggested action item, in some cases, the digital survey system trains the suggested-action-machine learner using annotated data. For instance, in certain implementations, the digital survey system trains the suggested-action-machine learner to select an action item for a response from among multiple possible action items. To name but a few examples, the action items may include a follow-up survey question, a follow-up contact, a meeting with a recipient, a work incentive or benefit, an improvement to a working environment, or a disciplinary action. The digital survey system may further compare the selected action item to a ground-truth-action item for the response. As part of the training process, in some cases, the digital survey system incrementally adjusts machine-learning parameters of the suggested-action-machine learner to select an action item that matches the ground-truth-action item.

The disclosed digital survey system overcomes the deficiencies of conventional digital survey systems. As suggested above, some existing digital survey systems rely almost solely on user input to construct survey questions. In contrast, the disclosed digital survey system uses a survey-creation-machine learner to analyze and extract textual features from initial survey questions to suggest survey questions for inclusion within a survey. By using the survey-creation-machine learner, the disclosed digital survey system detects textual features that conventional computer systems could not both detect and then align with suggested survey questions. Based on an ordered combination of unconventional rules, in some embodiments, the digital survey system automates creation of a digital survey based on a unique machine-learning technique.

Unlike the rigidity of question-by-question user creation in some conventional digital survey systems, the disclosed system's survey-creation-machine learner creates a more flexible and interactive approach to creating survey questions that exploits unique machine learning. For instance, in some cases, the disclosed digital survey system provides selectable options that automate the addition of multiple suggested survey questions relating to a survey category. This selectable option expedites digital-survey creation by adding machine-learning retrieved suggested questions. The selectable option also eliminates some of the back-and-forth communication between digital survey system and administrator device to reduce the input load on the digital survey system.

Beyond streamlining the creation of digital surveys, in some embodiments, the disclosed digital survey system improves the efficiency of distributing digital surveys and the accuracy with which such digital surveys elicit responses. Conventional digital survey systems traditionally provide options for distributing digital surveys, but lack the technical capability to forecast opportune times to distribute survey questions. Consequently, conventional digital survey systems sometimes repeatedly distribute digital surveys to compensate for a survey administrator or the system itself selecting times resulting in low response rates. This repeated distribution increases the computer-processing load of conventional digital survey systems. By contrast, in certain implementations, the disclosed digital survey system trains and uses a survey-timeframe-machine learner to determine suggested timeframes in which to send a digital survey to target survey recipients. Such a survey-timeframe-machine learner suggests timeframes corresponding to a particular or relative response rate to a digital survey to avoid or reduce the repeated survey distribution that hinders conventional digital survey systems. By exploiting a unique machine-learning protocol, the disclosed digital survey system improves the accuracy and effectiveness with which a system sends digital surveys to likely respondents.

In addition to improving the response rate of digital surveys, in certain embodiments, the disclosed digital survey system improves the accuracy and effectiveness of survey response data. As noted above, conventional digital survey systems often provide little or no guidance to a user in creating confusing or ambiguous survey questions. By contrast, in some cases, the disclosed survey-creation-machine learner provides suggested survey questions with a higher probability of eliciting a response, such as suggested survey questions with higher response rates and more effective and actionable data. In some cases, the survey-creation-machine learner provides suggested survey questions using language, phrasing, or terms that align with the information a survey administrator seeks to obtain. By suggesting survey questions more likely to elicit a response from a demographic group, for example, the survey-creation-machine learner can avoid skewing survey results to under or over represent a particular demographic group or tailor surveys to gather more information from a particular demographic group or population. Similarly, in certain implementations, the survey-creation-machine learner provides suggested survey questions with a higher probability of eliciting a response corresponding to a type of follow-up action or corresponding to no follow-up action, such as suggested survey questions that tend to not correspond to negative or mismatched follow-up actions as reported in annotated data. By suggesting survey questions that correspond to particular follow-up actions and avoiding mismatched follow-up actions, the disclosed system avoids compounding a confusing or ambiguous question with unreliable results.

In addition to improving response-rate accuracies, reducing computer-processing load, and improving question effectiveness, the disclosed digital survey system optionally automates a process of suggested action items to address responses that computing systems previously could not perform. Conventional digital survey systems often lack the technical capability of automatically addressing responses to survey questions. Some conventional digital survey systems provide generic follow-up options used for a response, but such follow-up options would lack tailoring to a respondent's specific response(s), situation, or other factors. By contrast, in some embodiments, the disclosed digital survey system uses a suggested-action-machine learner to determine suggested action items for specific responses to survey questions or for other inputs (e.g., changes in response over time or completion rate of previously suggested action items). Unlike conventional systems, the disclosed digital survey system uses a set of uniquely ordered machine-learning techniques to learn to determine a more precise recommendation for action for a particular survey response or other data inputs.

Turning now to the figures, FIG. 1 illustrates a block diagram of an environment 100 in which a digital survey system 118 operates in accordance with one or more embodiments. As illustrated in FIG. 1, the environment 100 includes an administrator device 104, recipient devices 110*a*-110*n*, and server device(s) 116, the latter of which includes a digital survey system 118. Each of the administrator device 104 and the recipient devices 110*a*-110*n* are associated with a type of user. A survey administrator 102 is associated with the administrator device 104 and uses the administrator device 104 to manage the creation and distribution of a digital survey. Moreover, recipients 108*a*-108*n* are respectively associated with the recipient devices 110a-110n and use the recipient devices 110a-110n to provide responses to a digital survey.

In some embodiments, the administrator device 104 and the recipient devices 110a-110n communicate with server device(s) 116 over a network 114. As described below, the server device(s) 116 can enable the various functions, features, processes, methods, and systems described herein using, for example, the digital survey system 118. As shown in FIG. 1, the digital survey system 118 comprises computer executable instructions that, when executed by a processor of the server device(s) 116, perform certain actions described below with reference to FIGS. 2-10. Additionally, or alternatively, in some embodiments, the server device(s) 116 coordinate with one or both of the administrator device 104 and the recipient devices 110a-110n to perform or provide the various functions, features, processes, methods, and systems described in more detail below. Although FIG. 1 illustrates a particular arrangement of the administrator device 104, the server device(s) 116, the recipient devices 110a-110n, and the network 114, various additional arrangements are possible. For example, the server device(s) 116 and the digital survey system 118 may directly communicate with the administrator device 104, bypassing the network 114.

Generally, the administrator device 104 and recipient devices 110a-110n may be any one of various types of client devices. For example, the administrator device 104 and recipient devices 110a-110n may be mobile devices (e.g., a smart phone, tablet), laptops, desktops, or any other type of computing devices, such as those described below with reference to FIG. 11. Additionally, the server device(s) 116 may include one or more computing devices, including those explained below with reference to FIG. 11. Moreover, the administrator device 104, the recipient devices 110a-110n, and the server device(s) 116 may communicate using any communication platforms and technologies suitable for transporting data and/or communication signals, including the examples described below with reference to FIG. 12.

To access the functionalities of the digital survey system 118, in certain embodiments, the survey administrator 102 interacts with an administrator device application 106 on the administrator device 104. Similarly, to access digital surveys and other functions of the digital survey system 118, in some implementations, the recipients 108a-108n interact with digital survey response applications 112a-112n, respectively. In some embodiments, one or both of the administrator device application 106 and digital survey response applications 112a-112n comprise web browsers, applets, or other software applications (e.g., native applications or web applications) available to the administrator device 104 or the recipient devices 110a-110n, respectively. Additionally, in some instances, the digital survey system 118 provides data packets including instructions that, when executed by the administrator device 104 or the recipient devices 110a-110n, create or otherwise integrate the administrator device application 106 or the digital survey response applications 112a-112n within an application or webpage for the administrator device 104 or the recipient devices 110a-110n, respectively.

As an initial overview, the server device(s) 116 provide the administrator device 104 access to the digital survey system 118 by way of the network 114. In one or more embodiments, by accessing the digital survey system 118, the server device(s) 116 provide one or more digital documents to the administrator device 104 to enable the survey administrator 102 to compose a digital survey. For example, the digital survey system 118 can include a website (e.g., one or more webpages) that enables the survey administrator 102 to create a digital survey for distribution to the recipient devices 110a-110n.

In some cases, the administrator device 104 launches the administrator device application 106 to facilitate interacting with the digital survey system 118. The administrator device application 106 may coordinate communications between the administrator device 104 and the server device(s) 116 that ultimately result in the creation of a digital survey that the digital survey system 118 distributes to one or more of the recipient devices 110a-110n. For instance, to facilitate the creation of a digital survey, the administrator device application 106 can provide graphical user interfaces of the digital survey system 118, receive indications of interactions from the survey administrator 102 with the administrator device 104, and cause the administrator device 104 to communicate user input based on the detected interactions to the digital survey system 118.

As suggested above, in some embodiments, the digital survey system 118 receives user input from the administrator device 104 to create an initial survey question for a digital survey. As used in this disclosure, the term "digital survey" refers to a digital communication that collects information concerning one or more respondents by capturing information from (or posing questions to) such respondents. Accordingly, a digital survey may include one or more digital survey questions. In some embodiments, a digital survey includes both initial survey questions and suggested survey questions.

Relatedly, the term "survey question" refers to a prompt within a digital survey that invokes a response from a respondent. A survey question may include one or both of interrogative sentences (e.g., "How are you?") and imperative sentences (e.g., "Please identify the clothing brand you prefer"). A survey question may also correspond to a response portion. For example, when describing a multiple-choice survey question, a survey question includes a question portion and corresponds to multiple-choice answers. Survey questions may come in various formats, including but not limited to, multiple choice, open-ended, ranking, scoring, summation, demographic, dichotomous, differential, cumulative, dropdown, matrix, net promoter score ("NPS"), single textbox, heat map, or any other type of formatting prompt that invokes a response from a respondent.

This disclosure often refers to specific types of survey questions. In particular, the term "initial survey question" refers to a survey question composed, input, or selected by a user. For example, in some embodiments, the term "initial survey question" includes a survey question based on input from a survey administrator and added to a digital-survey template. By contrast, the term "representative survey question" refers to a survey question that relates to an initial survey question. A representative survey question can relate to an initial survey question based on sharing or including textual features. For instance, in some cases, a representative survey question includes a survey question that includes a term or terms (or includes a synonymous term) from an initial survey question. As another example, in some implementations, a representative survey question includes a survey question that corresponds to an intent that reciprocates the intent of an initial survey question. As an example, both the representative survey question and the initial survey question can share a similar purpose (e.g., both questions are aimed at collecting information to determine employee job satisfaction).

Additionally, the term "suggested survey question" refers to a survey question that a digital survey system identifies or generates as an option for inclusion within a digital survey. For example, in some cases, the term "suggested survey question" refers to a survey question that commonly occurs in digital surveys with a representative survey question selected by a digital survey system. Similar to the survey questions described above, a suggested survey question may include a question portion and a corresponding response portion. For example, a suggested multiple-choice survey question may include a suggested question portion (e.g., "How long have you been an employee?") and a corresponding suggested response portion that includes suggested multiple-choice answers (e.g., "A. Under 2 years" and "B. Over 2 years").

As noted above, in some embodiments, the digital survey system uses a survey-creation-machine learner to identify textual features of the initial survey question and to select a representative survey question based on the identified textual features. As used in this disclosure, the term "machine learner" refers to a machine-learning model trained to approximate unknown functions based on training input. In particular, in some embodiments, the term "machine learner" can include an artificial-neural-network model of interconnected artificial neurons that communicate and learn to approximate complex functions and generate outputs based on inputs provided to the model.

The term "survey-creation-machine learner" refers to a machine learner trained to suggest one or more survey questions based on an initial survey question. In particular, in some embodiments, a "survey-creation-machine learner" includes a machine learner trained to select a representative survey question based on textual features of an initial survey question. For example, a survey-creation-machine learner may include, but is not limited to, the following machine-learning models as a basis for training: a convolutional neural network, a feedforward neural network, a fully convolutional neural network, a linear least squared regression, a logistic regression, a Naïve Bayes Support Vector Machine ("NBSVM"), a recurrent neural network ("RNN"), a recursive neural network ("RCNN"), or a support vector regression. Additionally, or alternatively, in certain embodiments, the survey-creation-machine learner includes unsupervised learning models, including, but not limited to, Autoencoders, Deep Belief Nets, Hierarchical Clustering, or k-means clustering.

Figure 2:
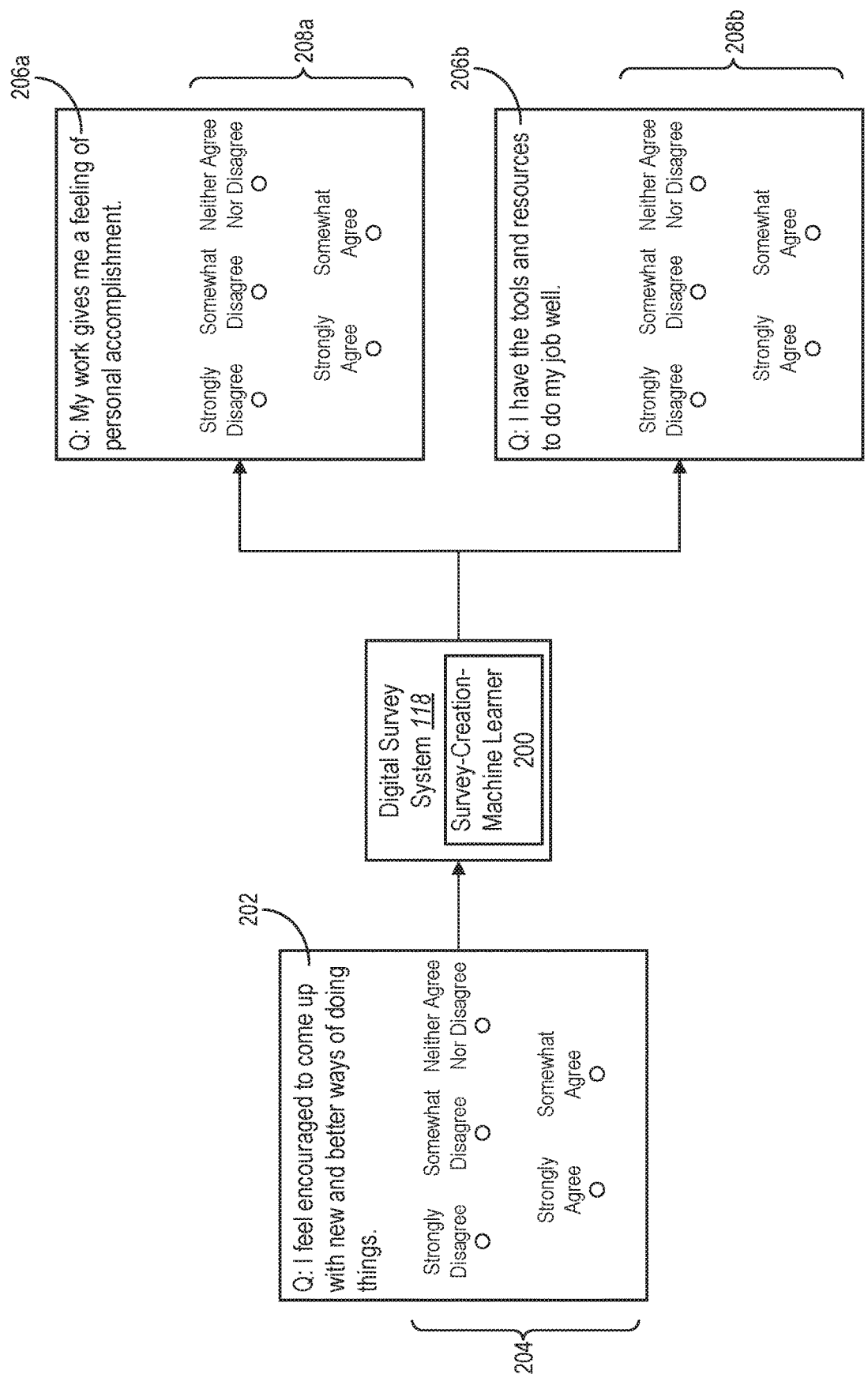
FIG. 2 illustrates a conceptual diagram of a digital survey system using a survey-creation-machine learner to provide suggested survey questions in accordance with one or more embodiments.

As further noted above, in some cases, the digital survey system 118 uses the survey-creation-machine learner to determine a suggested survey question. FIG. 2 provides an example of one such embodiment. In particular, FIG. 2 illustrates a conceptual diagram of the digital survey system 118 using a survey-creation-machine learner 200 to provide suggested survey questions.

As indicated by FIG. 2, the administrator device 104 sends (and the digital survey system 118 receives) user input to create an initial survey question 202. In this particular embodiment, the user input further indicates answer choices 204 input by the survey administrator 102 using the administrator device application 106. As suggested above, the administrator device 104 may detect user input from the survey administrator 102 inputting text to create the initial survey question 202 and the answer choices 204. Alternatively, the administrator device 104 may detect user input from the survey administrator 102 selecting the initial survey question 202 and the answer choices 204 (e.g., from a previous digital survey).

After receiving the initial survey question 202, the digital survey system 118 uses the survey-creation-machine learner 200 to identify textual features of the initial survey question 202, such as by identifying terms within (or the intent of) the initial survey question 202. Based on these identified textual features, the survey-creation-machine learner 200 selects a representative survey question. For example, the survey-creation-machine learner 200 may select a representative survey question with terms or a reciprocal intent corresponding to the initial survey question 202.

Based on the representative survey question, the digital survey system 118 uses the survey-creation-machine learner 200 to determine suggested survey questions 206a and 206b. For instance, the digital survey system 118 may determine a survey category for the representative survey question from a correlation database that correlates representative survey questions with survey categories. Based on the survey category, the digital survey system 118 further identifies the suggested survey questions 206a and 206b from the correlation database, which also correlates representative survey questions with suggested survey questions. As shown in FIG. 2, the suggested survey questions 206a and 206b correspond to a survey category matching the survey category that the digital survey system 118 determines for the initial survey question 202. Alternatively, in some embodiments, suggested survey questions correspond to different survey categories or to no identifiable survey categories.

As further shown in FIG. 2, the suggested survey questions 206a and 206b include suggested answer choices 208a and 208b, respectively. As shown, the suggested answer choices 208a and 208b are patterned after the answer choices 204. In additional or alternative embodiments, however, the suggested answer choices 208a and 208b may be in different formats, depending on the nature of the suggested survey questions 206a and 206b. In addition to generating the suggested survey questions and answer choices, in some implementations, the digital survey system 118 provides the suggested survey questions 206a and 206b and the suggested answer choices 208a and 208b to the administrator device 104 for display within a graphical user interface.

Figure 3A:
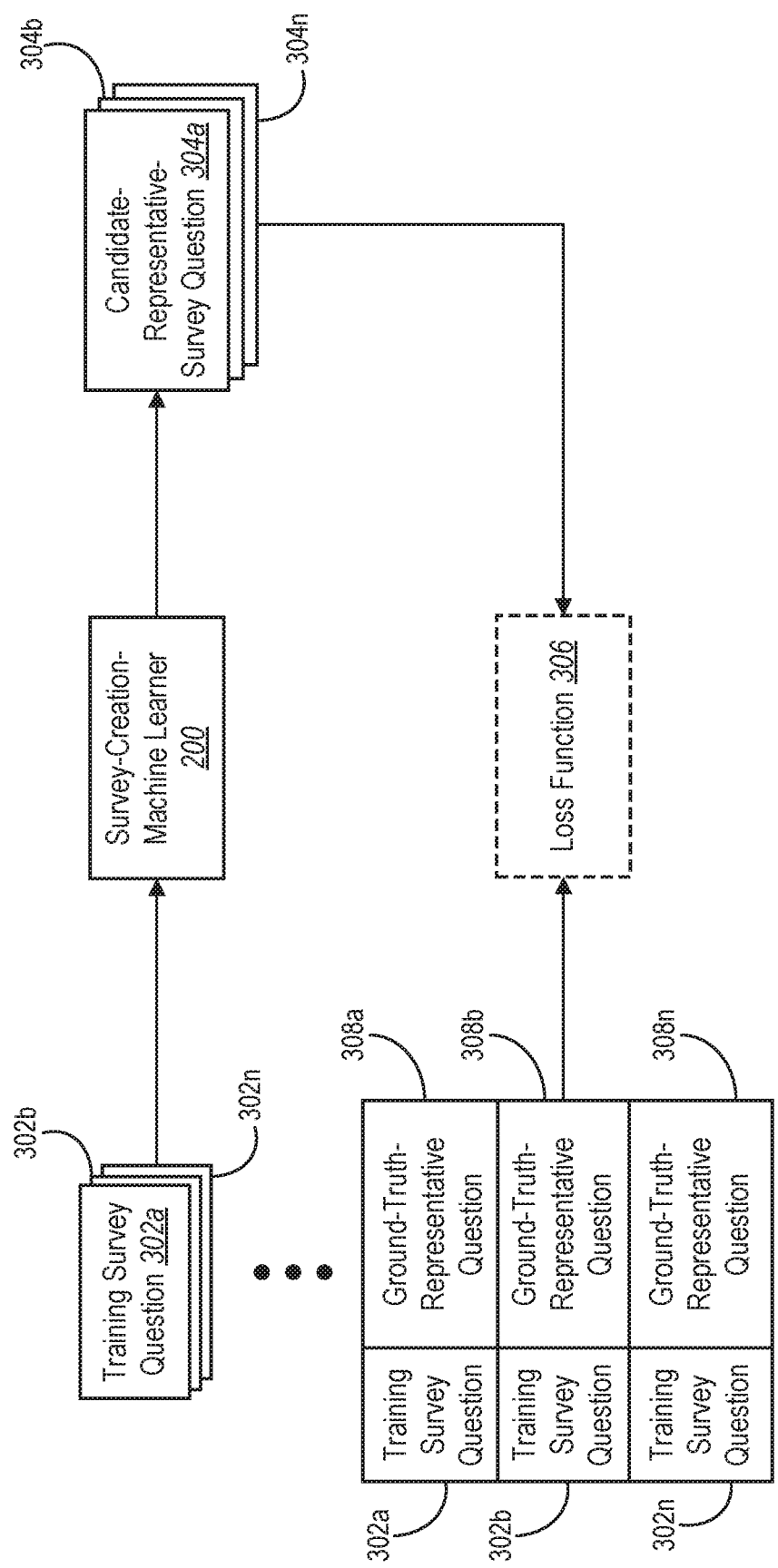
FIG. 3A illustrates a digital survey system training a survey-creation-machine learner to select representative survey questions based on training textual features of training survey questions in accordance with one or more embodiments.

As noted above, in some implementations, the digital survey system 118 trains the survey-creation-machine learner 200 to determine suggested survey questions based on determining one or more representative survey questions. FIG. 3A depicts an example of one such training process. In particular, FIG. 3A illustrates the digital survey system 118 training the survey-creation-machine learner 200 to select candidate-representative-survey questions based on training textual features of training survey questions. Using an iterative process of inputs and outputs, the digital survey system 118 determines candidate-representative-survey questions and compares those questions to ground-truth-representative-survey questions. The digital survey system 118 uses this comparison as a basis for adjusting machine-learning parameters of the survey-creation-machine learner 200.

As shown in FIG. 3A, for instance, the digital survey system 118 inputs a training survey question 302a into the survey-creation-machine learner 200. As used in this disclosure, the term "training survey question" refers to a survey question used for training a machine learner. The digital survey system 118 uses training survey questions in training the survey-creation-machine learner 200 similarly to how it uses initial survey questions in applying the survey-creation-machine learner 200. In some embodiments, each training survey question corresponds to a ground-truth-representative-survey question. Accordingly, in some cases, a training survey question correlates to annotated or tagged training data—that is, a corresponding ground-truth-representative-survey question. As shown in FIG. 3A, for instance, training survey questions 302a through 302n respectively correspond to ground-truth-representative-survey questions 308a through 308n.

After inputting the training survey question 302a, the digital survey system 118 uses the survey-creation-machine learner 200 to identify training textual features of the training survey question 302a. As noted above, the survey-creation-machine learner 200 may take the form of a variety of machine-learning models, including, for example, a NBSVM, an RNN, or an RCNN. But the digital survey system 118 may use any of the machine-learning models mentioned above as the survey-creation-machine learner 200.

In some implementations, the survey-creation-machine learner 200 extracts terms or words—or a combination of terms or words—from the training survey question 302a when identifying training textual features. For example, the survey-creation-machine learner 200 extracts terms and identifies an ordering of the extracted terms. To extract terms, in certain implementations, the digital survey system 118 uses an RNN or an RCNN as the survey-creation-machine learner 200. One such RNN and one such RCNN is described by Adrian Sanborn and Jacek Skryzalin, "Deep Learning for Semantic Similarity" (2015) (hereinafter "Sanborn"), available at https://cs224d.standford.edu/reports/SanbornAdrian.pdf, which is hereby incorporated by reference in its entirety.

Alternatively, the survey-creation-machine learner 200 determines an intent for the training survey question 302a when identifying training textual features. In some such embodiments, the survey-creation-machine learner 200 determines a semantic meaning of the training survey question 302a. For example, the digital survey system 118 uses an RNN as the survey-creation-machine learner 200. One such attention-based RNN is described by Bin Liu and Ian Lane, "Attention-Based Recurrent Neural Network Models for Joint Intent Detection and Slot Filling," Interspeech (2016) (hereinafter "Liu"), which is hereby incorporated by reference in its entirety.

In addition to identifying training textual features of the training survey question 302a, the digital survey system 118 uses the survey-creation-machine learner 200 to select a candidate-representative-survey question 304a for the training survey question 302a based on the identified training textual features. The survey-creation-machine learner 200 optionally selects the candidate-representative-survey question 304a from among multiple candidate-representative-survey questions. For example, the survey-creation-machine learner 200 may select the candidate-representative-survey question 304a from among candidate-representative-survey question 304a-304n stored in a representative-question database.

To select the candidate-representative-survey question 304a, in some embodiments, the survey-creation-machine learner 200 identifies terms extracted from the training survey question 302a within the candidate-representative-survey question 304a. Additionally, or alternatively, in certain implementations, the survey-creation-machine learner 200 identifies synonymous terms within the candidate-representative-survey question 304a corresponding to the extracted terms from the training survey question 302a. Having identified extracted or synonymous terms, in some cases, the survey-creation-machine learner 200 comprises an RNN that determines a probability score that a given training survey question belongs in a same category as a candidate-representative-survey question, as suggested by comparison of sentences in Sanborn. Accordingly, in one such embodiment, the survey-creation-machine learner 200 selects the candidate-representative-survey question 304a as having a highest probability score (from among multiple candidate-representative-survey questions) when compared to the training survey question 302a.

Additionally, or alternatively, in certain implementations, the survey-creation-machine learner 200 determines that a reciprocal intent of the candidate-representative-survey question 304a corresponds to the intent of the training survey question 302a. In some cases, the survey-creation-machine learner 200 determines that an intent tag for the candidate-representative-survey question 304a matches an intent tag for the training survey question 302a. For instance, the survey-creation-machine learner 200 optionally comprises an RNN that compares an intent classification of the training survey question 302a to the intent classification of multiple candidate-representative-survey questions, as suggested by Liu. Accordingly, in one such embodiment, the survey-creation-machine learner 200 selects the candidate-representative-survey question 304a (from among multiple candidate-representative-survey questions) as having the same intent classification as the training survey question 302a.

As suggested above, when training the survey-creation-machine learner 200, the digital survey system 118 compares the candidate-representative-survey question 304a to the ground-truth-representative-survey question 308a. In general, the digital survey system 118 compares candidate-representative-survey questions and ground-truth-representative-survey questions as a basis for adjusting machine-learning parameters. Accordingly, the digital survey system 118 uses ground-truth-representative-survey questions as reference points to measure the accuracy with which the survey-creation-machine learner 200 selects candidate-representative-survey questions.

In some embodiments, the digital survey system 118 uses a loss function 306 to compare candidate-representative-survey questions and ground-truth-representative-survey questions. When doing so, the digital survey system 118 may use a variety of loss functions as a means of comparison, including, but not limited to, mean squared error, mean squared logarithmic error, mean absolute error, cross entropy loss, negative logarithmic likelihood loss, or L2 loss. For instance, in some embodiments, the digital survey system 118 uses a cross-entropy-loss function as the loss function 306 when using an RNN to determine textual similarity (e.g., by using a probability score for sentence categories). As another example, the digital survey system 118 optionally uses a mean-squared-error function as the loss function 306 when using an RNN to determine intent of training survey questions and candidate-representative-survey questions.

As suggested above, in some embodiments, the digital survey system 118 adjusts machine-learning parameters of the survey-creation-machine learner 200 based on the loss determined from the loss function 306. For instance, the digital survey system 118 adjusts the machine-learning parameters based on an object to decrease a loss in a subsequent training iteration. Alternatively, in other cases, the digital survey system 118 adjusts the machine-learning parameters based on an object to increase a loss in a subsequent training iteration—depending on whether the loss is viewed as a positive or negative. By incrementally adjusting the machine-learning parameters, the digital survey system 118 improves the accuracy with which the survey-creation-machine learner 200 selects candidate-representative-survey questions when compared to the corresponding ground-truth-representative-survey questions.

As depicted in FIG. 3A, in some embodiments, the digital survey system 118 iteratively trains the survey-creation-machine learner 200. In particular, the digital survey system 118 runs a training iteration for each of the training survey questions 302a-302n. In addition to the training iteration described above for the training survey question 302a, the digital survey system 118 inputs the training survey question 302b into the survey-creation-machine learner 200. The survey-creation-machine learner 200 subsequently selects the candidate-representative-survey question 304b based on training textual features of the training survey question 302b. Moreover, the digital survey system 118 compares the candidate-representative-survey question 304b to the ground-truth-representative-survey question 308b by using the loss function 306 and adjusts the machine-learning parameters. The digital survey system 118 similarly uses the survey-creation-machine learner 200 for each training survey question up through the training survey question 302n and adjusts the machine-learning parameters in each subsequent iteration.

In addition to the embodiments depicted in FIG. 3A, in some cases, the digital survey system 118 uses alternative inputs and generates alternative outputs to train a survey-creation-machine learner. For example, in some implementations, the digital survey system 118 provides value propositions, survey categories, or demographic indicators as inputs for the survey-creation-machine learner. By using such alternative inputs, the digital survey system 118 trains the survey-creation-machine learner to output suggested survey questions or suggested survey categories.

For instance, the digital survey system 118 may use annotated training data that uses a value proposition as an input, where the value proposition corresponds to a ground-truth-suggested-survey question or a ground-truth-suggested-survey category. By iteratively inputting value propositions into the survey-creation-machine learner and generating candidate-suggested-survey questions or candidate-suggested-survey categories, the digital survey system 118 trains the survey-creation-machine learner to accurately generate candidate-suggested-survey questions or candidate-suggested-survey categories that correspond to ground-truth-suggested-survey questions or ground-truth-suggested-survey categories, respectively.

Figure 3B:
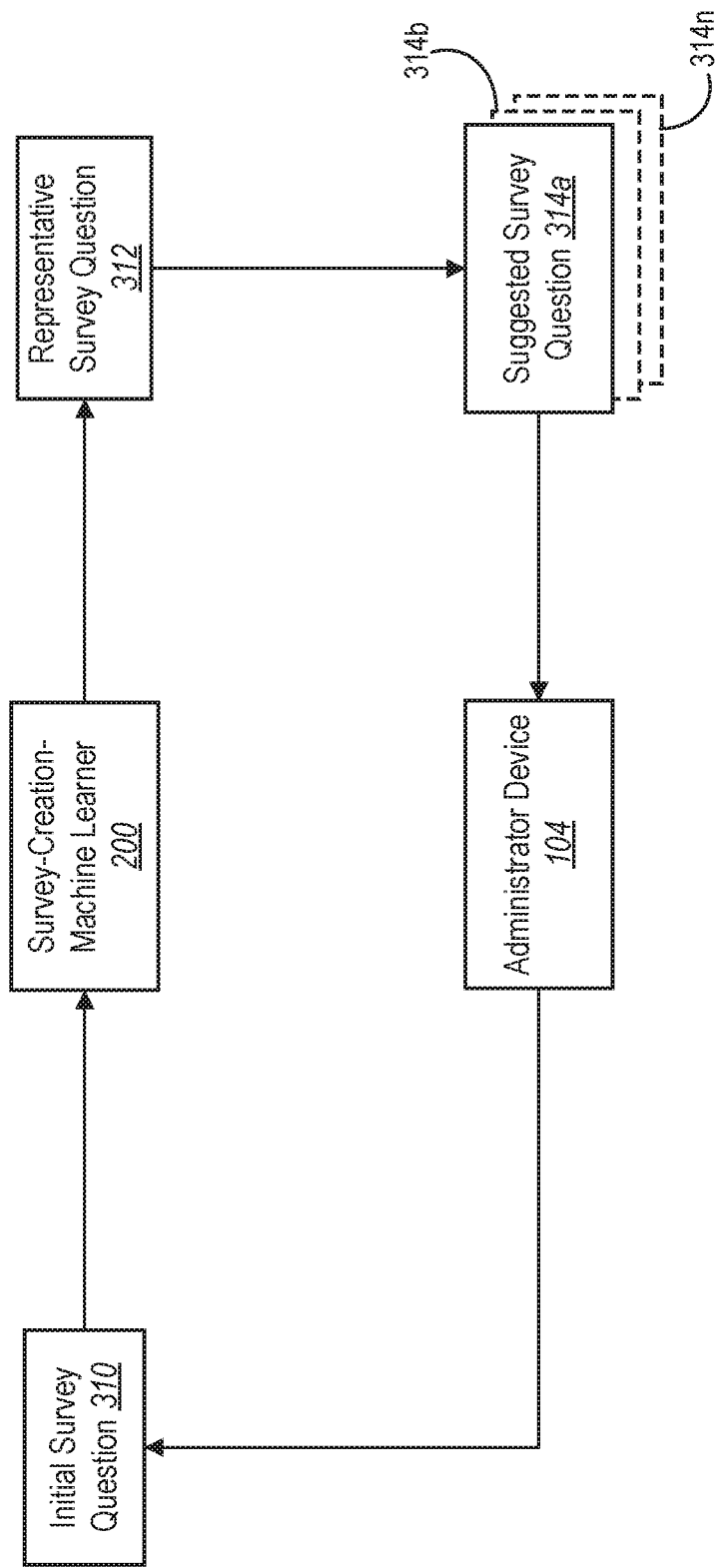
FIG. 3B illustrates a digital survey system using a survey-creation-machine learner to select a representative survey question and to determine a suggested survey question based on textual features of an initial survey question in accordance with one or more embodiments.

In addition to training the survey-creation-machine learner 200, in some embodiments, the digital survey system 118 applies the survey-creation-machine learner 200 to initial survey questions received from survey administrators. FIG. 3B illustrates the digital survey system 118 using the survey-creation-machine learner 200 to select a representative survey question 312 for an initial survey question 310. As further illustrated, the digital survey system 118 uses the survey-creation-machine learner 200 to determine a suggested survey question 314a based on textual features of the initial survey question 310 and provides the suggested survey question 314a to the administrator device 104 for display within a graphical user interface.

As shown in FIG. 3B, the administrator device 104 sends an indication of user input to the digital survey system 118 to create the initial survey question 310. For instance, the administrator device 104 may send the indication at any point during creation of a digital survey. In other words, the initial survey question 310 may be created as any number or in any order of a digital survey (e.g., as a first, second, third, or last survey question). As noted above, the administrator device 104 may detect user input in the form of textual input or a selection to create the initial survey question 310. But any suitable user input may indicate the initial survey question 310 (e.g., touch gestures, voice command).

After receiving the initial survey question 310, the digital survey system 118 uses the survey-creation-machine learner 200 to analyze the initial survey question 310. As above, the survey-creation-machine learner 200 may be an RNN, RCNN, or any other suitable machine-learning model. Consistent with the training described above, the survey-creation-machine learner 200 identifies textual features of the initial survey question 310 and selects the representative survey question 312 based on the initial survey question 310. Similar to the analysis of training textual features described above, the survey-creation-machine learner 200 optionally extracts terms from the initial survey question 310 and identifies the extracted terms (or synonymous terms) within the representative survey question 312 from among multiple survey questions. Additionally, in some cases, the survey-creation-machine learner 200 determines an intent of the initial survey question 310 and identifies the representative survey question 312 with a reciprocal intent. In performing such analyses, in certain implementations, the digital survey system 118 uses the RNN described in Sanborn or Liu.

In addition to selecting the representative survey question 312, the digital survey system 118 uses the survey-creation-machine learner 200 to determine the suggested survey question 314a as a recommendation for the survey administrator 102 based on the representative survey question 312. As further shown in FIG. 3B, the survey-creation-machine learner 200 optionally determines suggested survey questions 314b and 314n as recommendations for the survey administrator 102—based on the representative survey question 312.

To determine one or more suggested survey questions, in some implementations, the digital survey system 118 uses a correlation database that correlates representative survey questions with suggested survey questions. For example, in some cases, the correlation database correlates each representative survey question with one or more suggested survey questions that most commonly occur in a digital survey with the respective representative survey question. Accordingly, in some embodiments, the digital survey system 118 creates the correlation database by determining from within a digital-survey bank how often a survey question (from among potential representative survey questions) occurs with other survey questions within a digital survey. As shown in FIG. 3B, for instance, the digital survey system 118 determines suggested survey questions 314a, 314b, and 314n as recommendations for the survey administrator 102 by identifying these three survey questions within the correlation database as most commonly occurring with the representative survey question 312 within digital surveys.

In certain implementations, the digital survey system 118 uses a correlation database that correlates representative survey questions with ranked suggested survey questions. For example, in some cases, the digital survey system 118 ranks suggested survey questions 314a, 314b, and 314n based on how often each suggested survey question occurs with the representative survey question 312 within a digital survey. In some such embodiments, the digital survey system 118 provides only a certain number of suggested survey questions to the administrator device 104 from among ranked suggested survey questions, such as the top or top two ranked suggested survey questions.

As noted above, in some implementations, the digital survey system 118 determines suggested survey questions that correspond to one or more survey categories as recommendations. In some embodiments, the digital survey system 118 identifies a survey category for each survey question from within the correlation database. For instance, in some implementations, the suggested survey questions 314a, 314b, and 314n each correspond to different survey categories (e.g., survey categories of job satisfaction, productivity, and leadership). By contrast, in some implementations, the suggested survey questions 314a, 314b, and 314n each correspond to a same survey category (e.g., job satisfaction).

As further indicated by FIG. 3B, after determining the suggested survey question 314a as a recommendation, the digital survey system 118 provides the suggested survey question 314a to the administrator device 104 for display within a graphical user interface. Alternatively, when the digital survey system 118 determines the suggested survey questions 314b and 314n as recommendations, the digital survey system 118 further provides the suggested survey questions 314b and 314n within the graphical user interface. As suggested above, in certain applications, the digital survey system 118 provides a certain number of top-ranked suggested survey questions from the correlation database to the administrator device 104 for display within the graphical user interface, such as the suggested survey questions 314a and 314b as the top-two-ranked suggested survey questions.

In some cases, the graphical user interface further includes a selectable option to allow the survey administrator to add the suggested survey question 314a to the digital survey. Additionally, in some embodiments, the graphical user interface includes a survey-category indictor of a survey category corresponding to the suggested survey question 314a. Similarly, in certain implementations, the graphical user interface likewise includes selectable options and survey-category indicators for the suggested survey questions 314b and 314n.

Figure 4:
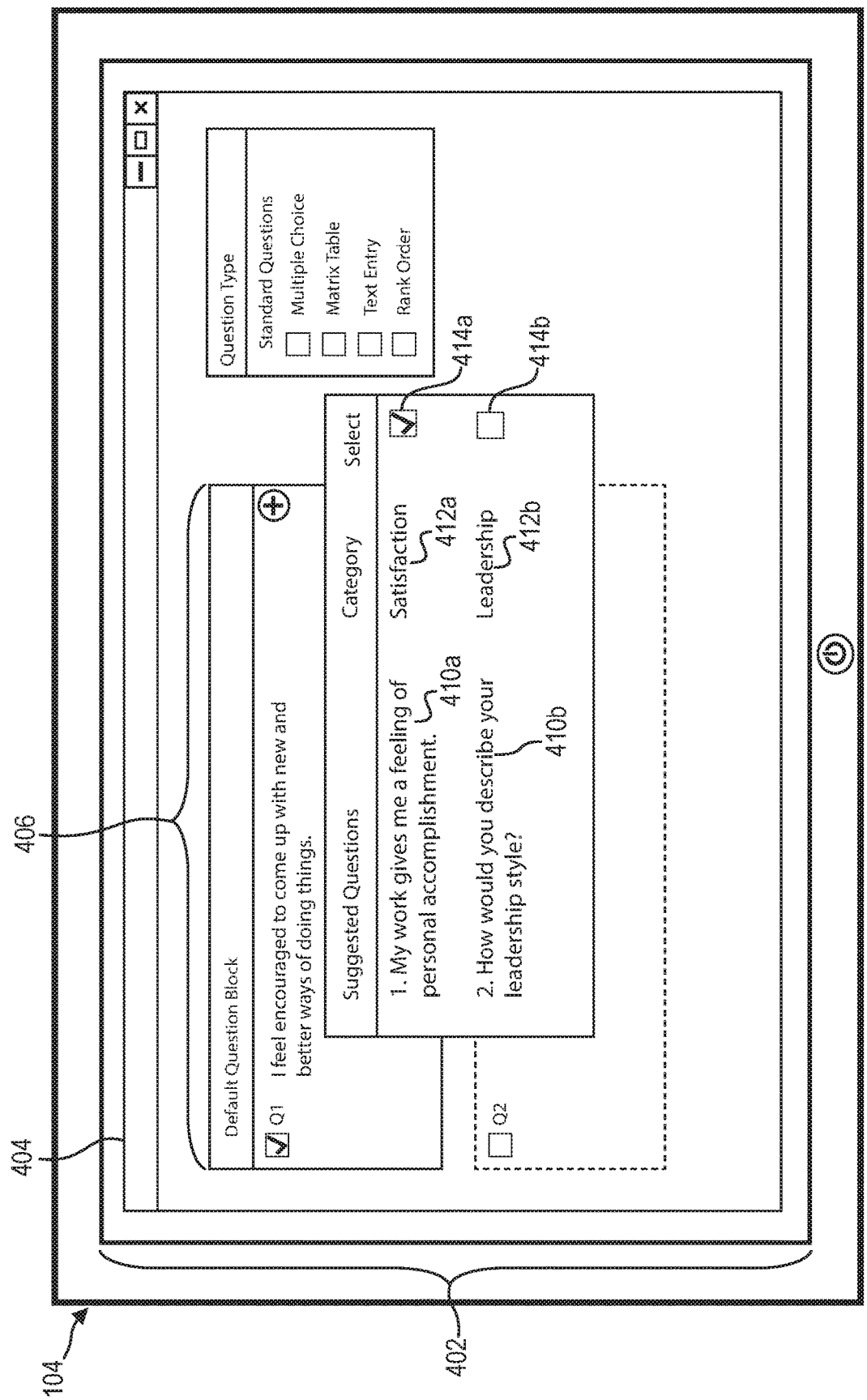
FIG. 4 illustrates a computing device presenting suggested survey questions in a graphical user interface in accordance with one or more embodiments.

FIG. 4 illustrates one such graphical user interface. In particular, FIG. 4 illustrates the administrator device 104 presenting suggested survey questions in a graphical user interface 404 within a screen 402. In some cases, the administrator device application 106 includes computer-executable instructions that cause the administrator device to present the graphical user interface 404. The graphical user interface 404 includes an initial survey question 408 and a digital-survey template 406 within which survey questions are displayed. Consistent with the disclosure above, the administrator device 104 renders the initial survey question 408 (and each subsequent survey question) within the graphical user interface 404 based on user input from the survey administrator 102. As shown here, the initial survey question 408 provides a basis upon which the digital survey system 118 determines and provides suggested survey questions 410a and 410b.

As further shown in FIG. 4, the digital survey system 118 provides survey-category indicators 412a and 412b that correspond to the suggested survey questions 410a and 410b, respectively, for display within the graphical user interface 404. In particular, the survey-category indicator 412a indicates a first survey category. The survey-category indicator 412b indicates a second survey category that differs from the first survey category.

In addition to the survey-category indicators 412a and 412b, the digital survey system 118 provides a selectable option 414a for the suggested survey question 410a and a selectable option 414b for the suggested survey question 410b. A user selection of the selectable options 414a and 414b causes the digital survey system 118 to add the corresponding suggested survey questions 410a and 410b to the digital-survey template 406. For example, based on the administrator device 104 detecting a selection by the survey administrator 102 of the selectable option 414a, the administrator device 104 sends an indication to the digital survey system 118. For instance, in some embodiments, the digital survey system 118 receives an indication of the selection of the selection option 414a, adds the corresponding suggested question 410 to the digital survey, and sends a digital signal causing the administrator device 104 to update the graphical user interface 404 to include the suggested survey question 410a within the digital-survey template 406.

As suggested above, in some embodiments, based upon detecting a user selection of a selectable option for a suggested survey question, the digital survey system 118 identifies supplementary suggested survey questions corresponding to a survey category. For instance, in certain implementations, when the administrator device 104 detects a selection by the survey administrator 102 of the selectable option 414a, the administrator device 104 sends an indication of the selection to the digital survey system 118. The digital survey system 118 subsequently identifies supplementary suggested survey questions corresponding to the first survey category. For instance, the digital survey system 118 may identify additional suggested survey questions from within a correlation database that correspond to a representative survey question (e.g., the top three most commonly occurring survey questions with the representative survey question).

Upon identifying supplementary suggested survey questions, the digital survey system 118 sends a digital signal to cause the administrator device 104 to further update the graphical user interface 404 to include supplementary suggested survey questions corresponding to the first survey category. Each supplementary suggested survey question may likewise correspond to a selectable option that (when selected) triggers the administrator device 104 to add the corresponding suggested survey question to the digital-survey template 406. Alternatively, the supplementary suggested survey question may collectively correspond to a selectable option that (when selected) triggers the administrator device 104 to add the supplementary suggested survey questions to the digital-survey template 406.

Although not shown in FIG. 4, the digital survey system 118 may further provide suggested answer choices for each suggested survey question. For example, in some embodiments, the digital survey system 118 provides suggested answer choices for each of the suggested survey questions 410a and 410b and for each supplementary suggested survey question. Regardless of the format of suggested survey questions, the digital-survey template 406 enables the administrator device 104 to detect any user edits to a suggested survey question or a suggested answer choice after selection.

Figure 5A:
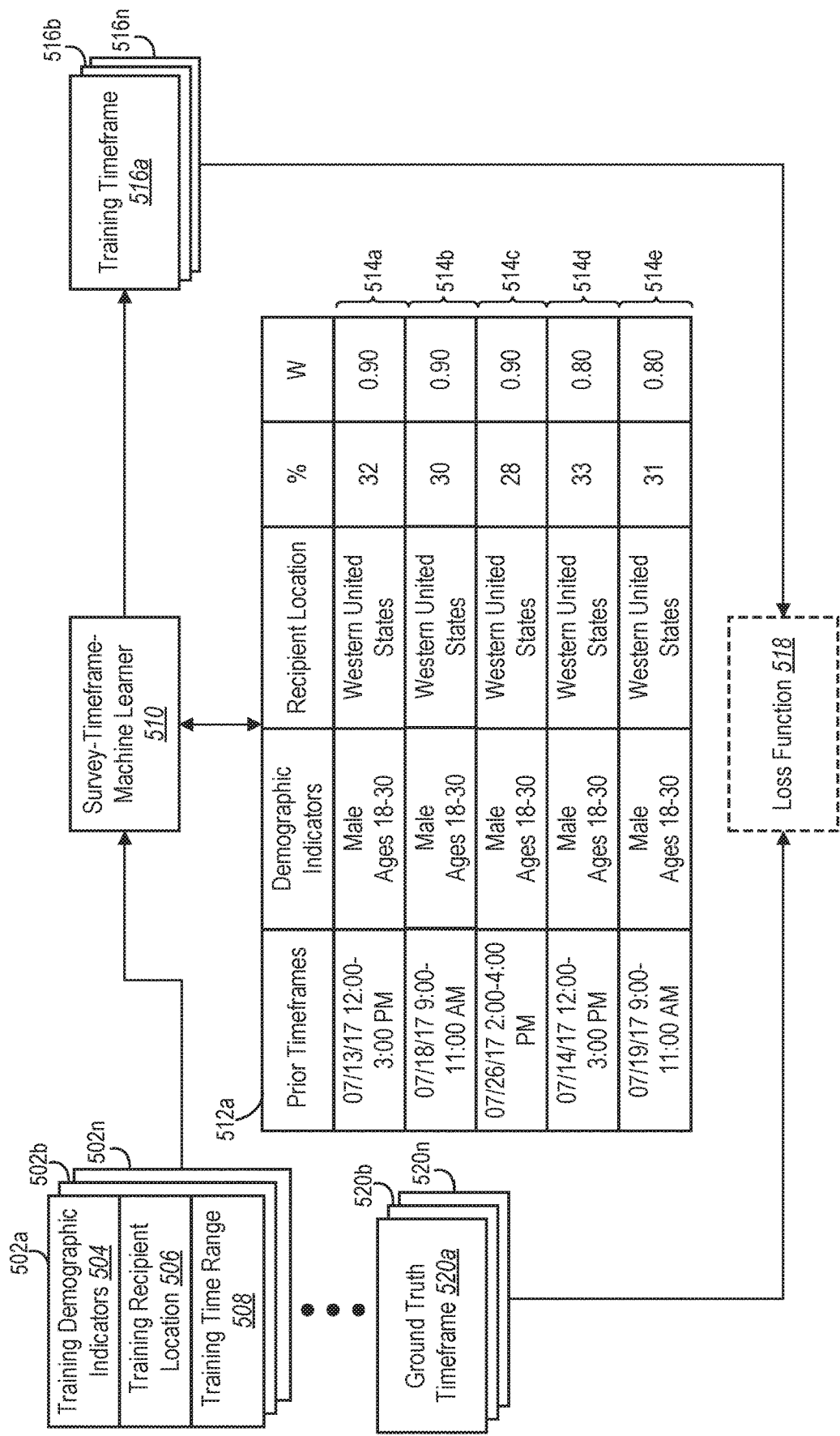
FIG. 5A illustrates a digital survey system training a survey-timeframe-machine learner to determine suggested timeframes for sending survey questions in accordance with one or more embodiments.

In addition, or in the alternative, to providing suggested survey questions, in some embodiments, the digital survey system 118 provides suggested timeframes for sending digital surveys that capture a highest predicted response rate. FIG. 5A depicts an example of training a survey-timeframe-machine learner to determine such suggested timeframes or, alternatively, to determine reference timeframes for such suggested timeframes. In particular, FIG. 5A illustrates the digital survey system 118 training a survey-timeframe-machine learner 510 to determine training timeframes for sending survey questions. Using an iterative process, the digital survey system 118 determines training timeframes and compares those timeframes to ground-truth timeframes as a basis for adjusting machine-learning parameters.

As shown in FIG. 5A, for instance, the digital survey system 118 inputs training recipient indicators 502a into the survey-timeframe-machine learner 510. As FIG. 5A suggests, training recipient indicators 502a through 502n represent training inputs that the digital survey system 118 uses to train the survey-timeframe-machine learner 510. As further indicated by FIG. 5A, each of the training recipient indicators 502a through 502n correspond to ground-truth timeframes 520a through 520n, respectively, as a point of comparison for training the survey-timeframe-machine learner 510.

Each of the training recipient indicators 502a through 502n define a set of prior survey recipients for which the digital survey system 118 maintains survey response results. For example, the training recipient indicators 502a comprise training demographic indicators 504 for prior survey recipients, a training recipient location 506 for the prior survey recipients, and a training time range 508 in which the prior survey recipients received survey questions. The training demographic indicators 504, the training recipient location 506, and the training time range 508 together define the prior survey recipients for which the survey-timeframe-machine learner 510 will predict a training timeframe. For instance, the training demographic indicators 504 may comprise males within the ages of 18-30, the training recipient location 506 may comprise recipients living in the Western United States, and the training time range 508 may comprise Jul. 1, 2017 to Jul. 31, 2017.

As used in this disclosure, the term "demographic indicator" refers to a demographic category describing survey recipients or survey respondents. As indicated in FIG. 5A, for example, demographic indicators may include the age or gender of survey recipients. In some embodiments, demographic indicators include, but are not limited to, address, age, birthdate, country of origin, citizenship, credit history, educational level, employer, ethnicity, gender, political ideology, political party, school, social security number, occupation, or any combination thereof. In some cases, the survey-timeframe-machine learner 510 utilizes a demographic indicator to identify and predict a training timeframe (or determine a suggested timeframe) for a subgroup of a population, such as survey recipients or survey respondents within a particular age range or engaged in a particular population. Relatedly, the term "training demographic indicators" refers to demographic indicators that are used to train a survey-timeframe-machine learner and that describe prior survey recipients.

In contrast to the training demographic indicators 504, the training recipient location 506 indicates a recipient location for the prior survey recipients. As used in this disclosure, the term "recipient location" refers to a location for a survey recipient, such as a country, region, state, province, city, or neighborhood. For instance, in some cases, a recipient location is a location indicated by a survey recipient's online or social-media profile. As another example, in some implementations, a recipient location is a location at which a survey recipient works or lives. Moreover, in some embodiments, a recipient location is a location at which a recipient device accesses a digital survey (e.g., from the server device(s) 116). In some cases, the survey-timeframe-machine learner 510 utilizes a recipient location to identify and predict a training timeframe (or determine a suggested timeframe) for a subgroup of a population, such as survey recipients or survey respondents whose online profile or Internet Protocol address indicates they live within a particular country, state, or region (e.g., Europe and North America). Relatedly, the term "training recipient location" refers to a recipient location for prior survey recipients used to train a survey-timeframe-machine learner.

As used in this disclosure, the term "time range" refers to a period in which survey recipients receive a digital survey or a survey question. Accordingly, a time range may include a range of days, weeks, months, or years in which survey recipients receive a digital survey. Similarly, the term "training time range" refers to a period in which prior survey recipients received a digital survey, where the period is used to train a survey-timeframe-machine learner.

As further shown in FIG. 5A, after inputting the training recipient indicators 502a, the digital survey system 118 uses the survey-timeframe-machine learner 510 to determine (from within the training time range 508) the training timeframe 516a for sending the prior survey recipients the digital survey or survey questions. As used in this disclosure, the term "survey-timeframe-machine learner" refers to a machine learner trained to suggest one or more timeframes in which to distribute or send a digital survey or survey questions. In particular, in some implementations, the term "survey-timeframe-machine learner" refers to a machine learner trained to suggest one or more timeframes in which to distribute or send a digital survey to survey recipients who satisfy certain recipient indicators.

For example, a survey-timeframe-machine learner may include, but is not limited to, the following machine-learning models as a basis for training: a convolutional neural network, a feedforward neural network, a fully convolutional neural network, a linear least squared regression, a logistic regression, an NBSVM, an RNN, an RCNN, or a support vector regression. Additionally, or alternatively, in some embodiments, the survey-timeframe-machine learner includes unsupervised learning models, including, but not limited to, Autoencoders, Deep Belief Nets, Hierarchical Clustering, or k-means clustering.

In certain implementations, the digital survey system 118 uses a Logistic Regression-Least Squares Regression Hybrid or a Support Vector Classification-Support Vector Regression Hybrid as the machine-learning model for the survey-timeframe-machine learner 510. Both such hybrid machine-learning models are described by Zach Ellison and Seth Hildick-Smith, "Blowing up the Twittersphere: Predicting the Optimal Time to Tweet" (2014), available at https://cs229.stanford.edu/proj2014/, which is hereby incorporated by reference in its entirety.

As used in this disclosure, the term "training timeframe" refers to a target timeframe in which a machine learner predicts prior survey recipients responded to survey questions at a particular or relative response rate. In some embodiments, the survey-timeframe-machine learner 510 determines a training timeframe as a form of a suggested timeframe for training purposes based on training recipient indicators. By contrast, in some embodiments, the survey-timeframe-machine learner 510 determines a training timeframe as a reference timeframe upon which the digital survey system 118 may determine a suggested timeframe based on training recipient indicators. Relatedly, the term "suggested timeframe" refers to a target timeframe in which a machine learner predicts target survey recipients will respond to survey questions at a particular or relative response rate. In some embodiments, the survey-timeframe-machine learner 510 determines a suggested timeframe corresponding to a highest predicted response rate to a digital survey for certain target survey recipients. This disclosure describes suggested timeframes and reference timeframes further below with reference to FIG. 5B.

To determine a training timeframe, in some embodiments, the survey-timeframe-machine learner 510 determines response rates for multiple training survey clusters of responses from prior survey recipients who satisfy the training recipient indicators 502a. Such training survey clusters may differ by timeframe but otherwise share the same training recipient indicators. For instance, a first training survey cluster may comprise responses from prior survey recipients who (i) received digital surveys within a first prior timeframe and who correspond to both (ii) the training demographic indicators 504 and (iii) the training recipient location 506 for the target survey recipients. Similarly, a second training survey cluster may comprise responses from prior survey recipients who (i) received digital surveys within a second prior timeframe and who correspond to both (ii) the training demographic indicators 504 and (iii) the training recipient location 506 for the target survey recipients. In addition to these examples, the survey-timeframe-machine learner 510 optionally determines response rates for hundreds, thousands, or millions of such training survey clusters.

In some such embodiments, the survey-timeframe-machine learner 510 applies a machine-learning parameter to each of the response rates to determine a weighted response rate for each prior timeframe. For instance, in some cases, the survey-timeframe-machine learner 510 applies a weight as a machine-learning parameter to the response rates for training survey clusters. To provide but a few examples, the machine-learning parameters for the survey-timeframe-machine learner 510 may comprise (i) a weight for each day of the year encompassing a prior timeframe, (ii) a weight for each week of the year encompassing a prior timeframe, or (iii) a weight for each month of the year encompassing a prior timeframe.

As indicated in FIG. 5A, in certain implementations, the survey-timeframe-machine learner 510 uses a survey-response database 512a to determine and apply machine-learning parameters to a prior timeframe's response rate. The survey-response database 512a includes rows of training survey clusters 514a-514e. Each of the training survey clusters 514a-514e include a prior timeframe, demographic indicators, a recipient location, a response rate, and a machine-learning parameter.

In the embodiment shown in FIG. 5A, the survey-response database 512a includes training survey clusters that correspond to prior timeframes dating at least one year before the training time range 508. For example, assuming the training time range 508 comprises Jul. 1, 2018 to Jul. 31, 2018, each of the prior timeframes within the training survey clusters 514a-514e date back to July 2017. During the training process, the survey-timeframe-machine learner 510 adjusts the machine-learning parameters corresponding to prior timeframes to more accurately determine a training timeframe in a subsequent training iteration.

As noted above, in the first training iteration shown in FIG. 5A, the survey-timeframe-machine learner 510 determines the training timeframe 516a based on the training recipient indicators 502a. Here, the training timeframe 516a corresponds to a highest predicted response rate for the prior survey recipients based on a comparison of weighted response rates for prior timeframes. For instance, in some embodiments, the survey-timeframe-machine learner 510 determines that the weighted response rate corresponding to the prior timeframe for the training survey cluster 514a exceeds the weighted response rates corresponding to the prior timeframes for the training survey clusters 514b-514e. Accordingly, in some embodiments, the survey-timeframe-machine learner 510 selects the prior timeframe for the training survey cluster 514a as the training timeframe 516a.

As further indicated by FIG. 5A, in addition to determining a training timeframe, the digital survey system 118 compares the training timeframe 516a to a ground-truth timeframe 520a. As noted above, the training recipient indicators 502a correspond to the ground-truth timeframe 520a. In general, the digital survey system 118 compares training timeframes and ground-truth timeframes as a basis for adjusting the machine-learning parameters of the survey-timeframe-machine learner 510. Accordingly, the digital survey system 118 uses ground-truth timeframes as reference points to measure the accuracy with which the survey-timeframe-machine learner 510 determines training timeframes representing reference timeframes or suggested timeframes.

In some embodiments, the digital survey system 118 uses a loss function 306 to compare training timeframes and ground-truth timeframes. When doing so, the digital survey system 118 may use a variety of loss functions as a means of comparison, including, but not limited to, mean squared error, mean squared logarithmic error, mean absolute error, cross entropy loss, negative logarithmic likelihood loss, or L2 loss. For example, in some embodiments, the digital survey system 118 uses a mean-squared-error function as the loss function 518 when using a Logistic Regression-Least Squares Regression Hybrid or a Support Vector Classification-Support Vector Regression Hybrid to determine training timeframes.

As suggested above, in some embodiments, the digital survey system 118 adjusts machine-learning parameters of the survey-timeframe-machine learner 510 based on the loss determined from the loss function 518. For instance, in some cases, the digital survey system 118 adjusts the machine-learning parameters based on an object to decrease (or increase) a loss in a subsequent training iteration—depending on whether the loss is viewed as a positive or negative. By incrementally adjusting the machine-learning parameters, the digital survey system 118 improves the accuracy with which the survey-timeframe-machine learner 510 determines training timeframes when compared to the corresponding ground-truth timeframes.

As depicted in FIG. 5A, in some embodiments, the digital survey system 118 iteratively trains the survey-timeframe-machine learner 510. In particular, the digital survey system 118 runs a training iteration for each of the training recipient indicators 502a-502n. In addition to the training iteration described above for the training recipient indicators 502a, the digital survey system 118 uses the survey-timeframe-machine learner 510 to determine a training timeframe 516b based on the training recipient indicators 502b. The digital survey system 118 subsequently compares the training timeframe 516b to the ground-truth timeframe 520b by using the loss function 518 and adjusts the machine-learning parameters based on a determined loss. The digital survey system 118 similarly uses the survey-timeframe-machine learner 510 for each the training recipient indicators up through the training recipient indicators 502n and adjusts the machine-learning parameters in each subsequent iteration.

In addition to the embodiments depicted in FIG. 5A, in some cases, the digital survey system 118 uses alternative inputs to train a survey-timeframe-machine learner. For example, in addition (or in the alternative) to using the training recipient indicators 502a, in some embodiments, the digital survey system 118 inputs response rates. The digital survey system 118 may use annotated training data using response rates among the training recipient indicators, where the response rate corresponds to a prior response rate for a prior time range and a ground-truth timeframe. By iteratively inputting such training recipient indicators into the survey-timeframe-machine learner and generating training timeframes, the digital survey system 118 trains the survey-timeframe-machine learner to accurately determine training timeframes.

Figure 5B:
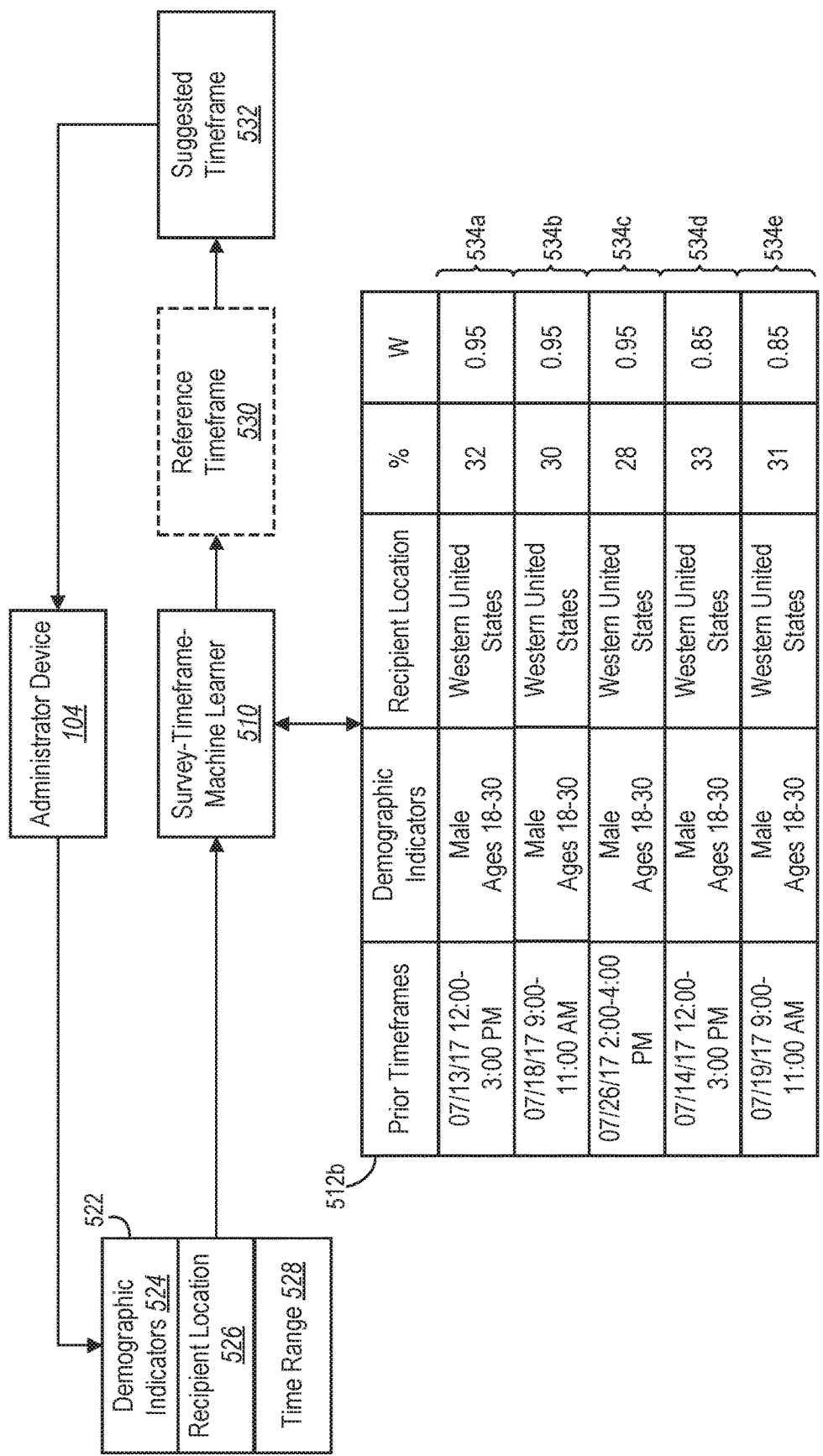
FIG. 5B illustrates a digital survey system using a survey-timeframe-machine learner to determine a suggested timeframe in which to send survey questions in accordance with one or more embodiments.

In addition to training the survey-timeframe-machine learner 510, in some embodiments, the digital survey system 118 applies the survey-timeframe-machine learner 510 to recipient indicators from administrators. FIG. 5B illustrates the digital survey system 118 using the survey-timeframe-machine learner 510 to determine a suggested timeframe 532 in which to send survey questions based on recipient indicators 522. As further indicated by FIG. 5B, the digital survey system 118 provides the suggested timeframe 532 to the administrator device 104 for display within a graphical user interface.

As shown in FIG. 5B, the administrator device 104 sends an indication of user input to the digital survey system 118 to create or select the recipient indicators 522. In particular, the recipient indicators 522 comprise demographic indicators 524 for target survey recipients, a recipient location 526 for the target survey recipients, and a time range 528 in which to send a digital survey. Accordingly, the demographic indicators 524, the recipient location 526, and the time range 528 define the target survey recipients for which the digital survey system 118 will determine a suggested timeframe. For example, the demographic indicators 524 may comprise males within the ages of 18-30, the recipient location 526 may comprise recipients living in the Western United States, and the time range 528 may comprise Jul. 1, 2018 to Jul. 31, 2018.

After receiving the recipient indicators 522, the digital survey system 118 uses the survey-timeframe-machine learner 510 to determine the suggested timeframe 532. As noted above, the survey-timeframe-machine learner 510 may take the form of a variety of machine-learning models, including, for example, a logistic regression, a Logistic Regression-Least Squares Regression Hybrid, an RNN, an RCNN, or a Support Vector Classification-Support Vector Regression Hybrid. But the digital survey system 118 may use any of the machine-learning models mentioned above as the survey-timeframe-machine learner 510.

In some embodiments, the digital survey system 118 uses the survey-timeframe-machine learner 510 to determine a reference timeframe 520 for the suggested timeframe 532. As used in this disclosure, the term "reference timeframe" refers to a past corollary timeframe for a suggested timeframe. In some cases, the term "reference timeframe" refers to a past corollary timeframe corresponding to a highest weighted response rate for past survey recipients who satisfy certain recipient indicators. Accordingly, a reference timeframe optionally indicates a corollary in the past to a future suggested timeframe, where the future suggested timeframe corresponds to a highest predicted response rate for target survey recipients responding to a digital survey. Moreover, in some embodiments, the survey-timeframe-machine learner 510 outputs the reference timeframe 530 using the process and machine-learning parameters learned during training.

To determine the reference timeframe 530, in some embodiments, the survey-timeframe-machine learner 510 determines response rates for prior survey recipients from multiple survey clusters, where the prior survey recipients satisfy the recipient indicators 522. As in the training described above, such survey clusters may differ by timeframe but otherwise share the same recipient indicators. For instance, a first survey cluster may comprise responses from prior survey recipients who (i) received digital surveys within a first prior timeframe and who correspond to both (ii) the demographic indicators 524 and (iii) the recipient location 526 for the target survey recipients. Similarly, a second training survey cluster may comprise responses from prior survey recipients who (i) received digital surveys within a second prior timeframe and who correspond to both (ii) the demographic indicators 524 and (iii) the recipient location 526 for the target survey recipients. In addition to these examples, the survey-timeframe-machine learner 510 optionally determines response rates for hundreds, thousands, or millions of such survey clusters.

Consistent with the training described above, in some embodiments, the survey-timeframe-machine learner 510 applies a machine-learning parameter to each of the survey cluster's response rates to determine a weighted response rate for each prior timeframe. For instance, in some cases, the survey-timeframe-machine learner 510 applies the updated weights from an updated survey-response database 512b to each response rate. As shown in FIG. 5B, for instance, the updated survey-response database 512b represents an updated version of the survey-response database 512a—with updated weights that the survey-timeframe-machine learner 510 learned during training. The updated survey-response database 512b includes rows of survey clusters 534a-534e. Each of the survey clusters 534a-534e include a prior timeframe, demographic indicators, a recipient location, a response rate, and an updated machine-learning parameter.

By applying the updated machine-learning parameters to each response rate, the survey-timeframe-machine learner 510 determines that a prior timeframe corresponds to a highest weighted response rate for survey recipients who satisfy the recipient indicators 522. For instance, in some embodiments, the survey-timeframe-machine learner 510 determines that the weighted response rate corresponding to the prior timeframe for the survey cluster 534a exceeds the weighted response rates corresponding to the prior timeframes for the survey clusters 534b-534e. Accordingly, in this particular embodiment, the survey-timeframe-machine learner 510 selects the prior timeframe for the survey cluster 534a as the reference timeframe 530.

As further indicated by FIG. 5B, the digital survey system 118 optionally determines the suggested timeframe 532 based on the reference timeframe 530. As noted above, in certain implementations, the suggested timeframe 532 corresponds to a highest predicted response rate to a digital survey for the target survey recipients. For example, the digital survey system 118 may identify a current corollary of the reference timeframe 530 to be the suggested timeframe 532. As a practical example, assuming Thursday, Jul. 13, 2017 at 12:00-3:00 p.m. is the reference timeframe 530 for the survey cluster 534a, the survey-timeframe-machine learner 510 selects Thursday, Jul. 12, 2018 at 12:00-3:00 p.m. as the suggested timeframe 532.

As further indicated by FIG. 5B, after determining the suggested timeframe 532, the digital survey system 118 provides the suggested timeframe 532 to the administrator device 104 for display within a graphical user interface. In some cases, the graphical user interface further includes a selectable option for the suggested timeframe 532. Additionally, in some embodiments, the graphical user interface includes multiple suggested timeframes with corresponding selectable options. As for the latter embodiment, the survey-timeframe-machine learner 510 optionally selects multiple reference timeframes corresponding to prior timeframes having the highest weighted response rate for survey recipients who satisfy certain recipient indicators. In such embodiments, the digital survey system 118 subsequently identifies multiple suggested timeframes as current corollaries to the reference timeframes.

In addition to determining the suggested timeframe 532, in some implementations, the digital survey system 118 further uses the suggested timeframe 532 as a prior timeframe after adequate time has passed to train the survey-timeframe-machine learner 510. After the time range 528 passes and the digital survey system 118 determines response rates for the digital survey, for example, the digital survey system 118 adjusts the machine-learning parameters such that the survey-timeframe-machine learner would determine a suggested timeframe corresponding to the highest recorded response rate to a digital survey.

As suggested above, in some embodiments, the survey-timeframe-machine learner 510 may run multiple iterations to determine suggested timeframes in which to send survey questions to different subgroups based on differing recipient indicators. For instance, the survey-timeframe-machine learner may determine a suggested timeframe for a first subgroup using a first recipient location for Europe and determine a suggested timeframe for a second subgroup using a second recipient location for North America.

Figure 6:
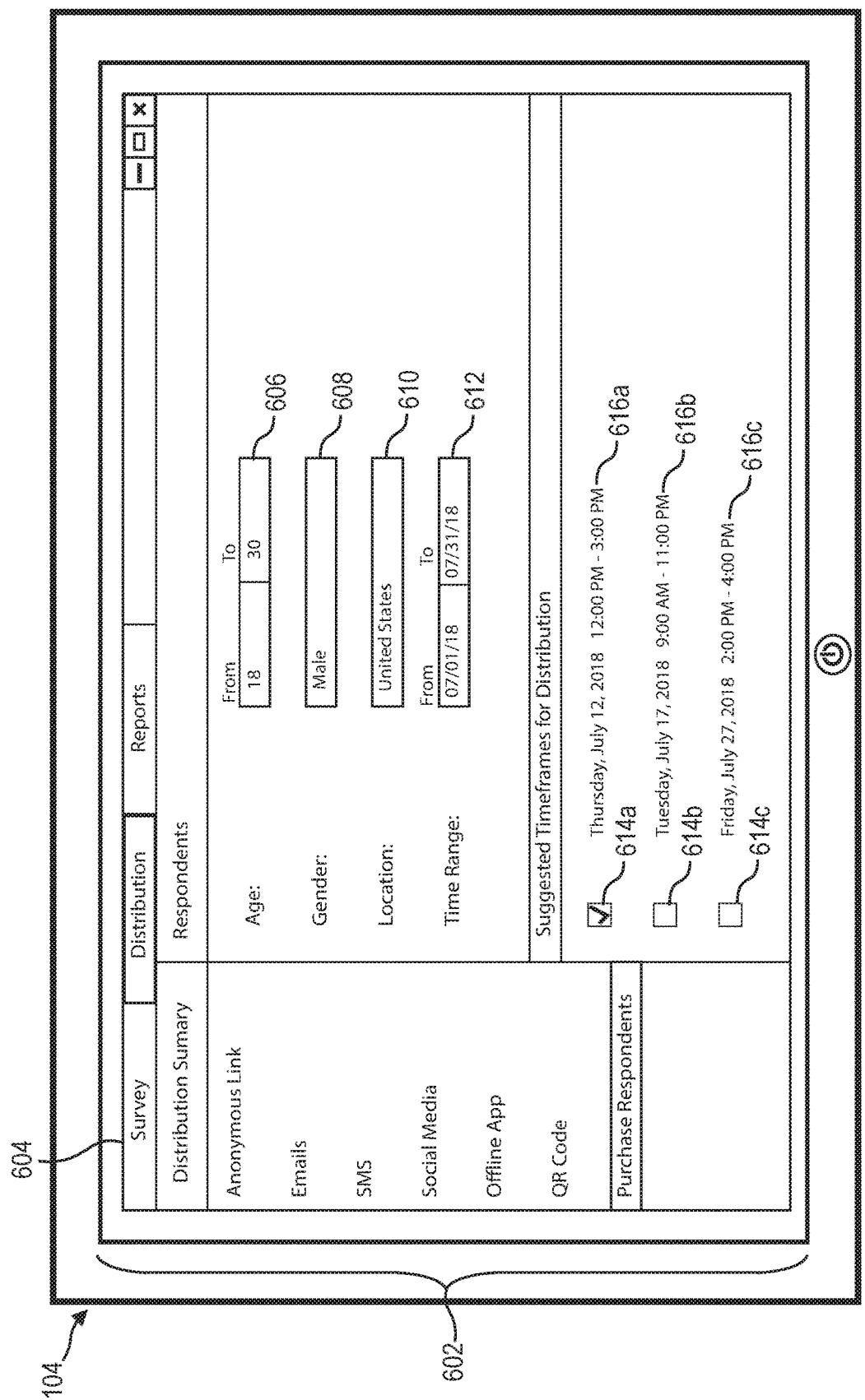
FIG. 6 illustrates a computing device presenting suggested timeframes in a graphical user interface in accordance with one or more embodiments.

Turning back now to graphical user interfaces for suggested timeframes, FIG. 6 illustrates one such graphical user interface with multiple suggested timeframes. In particular, FIG. 6 depicts the administrator device 104 presenting suggested timeframes 616a-616c in a graphical user interface 604 within a screen 602. The graphical user interface 604 includes an age indicator 606, a gender indicator 608, a recipient-location indicator 610, and a time-range indicator 612—as a basis for the digital survey system 118 to determine the suggested timeframes 616a-616c. In some cases, the administrator device application 106 includes computer-executable instructions that cause the administrator device to present the graphical user interface 604.

As shown in FIG. 6, the administrator device 104 detects user input from the survey administrator 102 to create or select various recipient indicators, including demographic indicators, a recipient location, and a time range in which to send a digital survey to target survey recipients. Based on the user input, the administrator device 104 presents the relevant recipient indicators within the age indicator 606, the gender indicator 608, the recipient-location indicator 610, and the time-range indicator 612.

Consistent with the disclosure above, the digital survey system 118 determines the suggested timeframes 616a-616c in which to send the target survey recipients based on the recipient indicators. Upon receiving an indication of the suggested timeframes 616a-616c from the digital survey system 118, the administrator device 104 presents the suggested timeframes 616a-616c within the graphical user interface 604 with corresponding selectable options 614a-614c. As indicated in FIG. 6, the selectable options 614a-614c correspond to the suggested timeframes 616a-616c, respectively.

As shown in FIG. 6, a user selection of the selectable options 614a-614c triggers the digital survey system 118 to select the corresponding suggested timeframe as the timeframe in which to distribute a digital survey to the target survey respondents. For example, when the administrator device 104 detects a selection by the survey administrator 102 of the selectable option 614a, the administrator device 104 sends an indication to the digital survey system 118 to use the suggested timeframe 616a for sending the digital survey to the target survey recipients. In some embodiments, the digital survey to be sent to the target survey recipients includes any initial survey questions and/or suggested survey questions created or selected by the survey administrator 102.

Figure 7A:
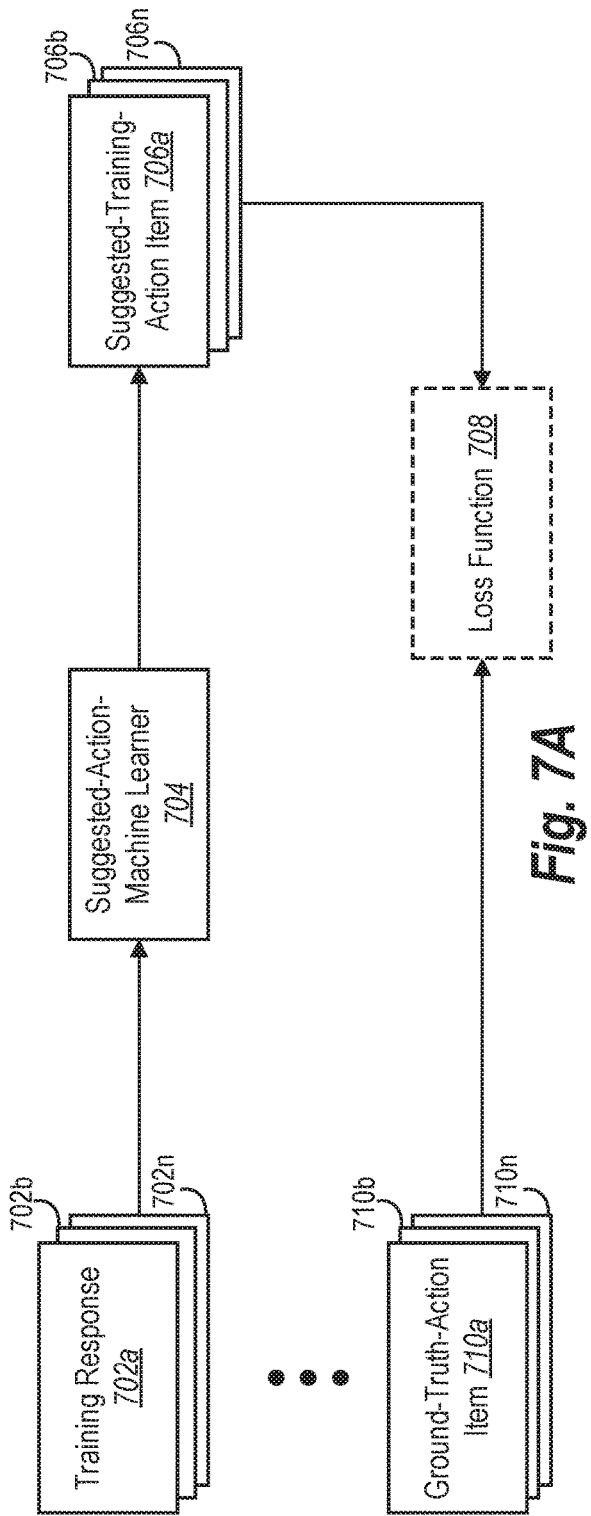
FIG. 7A illustrates a digital survey system training a suggested-action-machine learner to determine suggested action items for training responses to survey questions in accordance with one or more embodiments.

As noted above, in addition (or in the alternative) to using a machine learner to suggest timeframes, in some embodiments, the digital survey system 118 suggests action items to survey administrators for following up on particular survey responses or other data inputs explained below. FIG. 7A depicts an example of training a suggested-action-machine learner to determine such suggested action items. In particular, FIG. 7A illustrates the digital survey system 118 training a suggested-action-machine learner 704 to determine suggested action items to address training responses to survey questions. By running multiple iterations, the digital survey system 118 determines suggested-training-action items and compares the training action items to ground-truth-action items. The digital survey system 118 uses this comparison as a basis for adjusting machine-learning parameters to improve the accuracy with which the suggested-action-machine learner 704 determines suggested-training-action items.

As used in this disclosure, the term "suggested-action-machine learner" refers to a machine learner trained to suggest one or more action items for a response to a survey question. In some implementations, the term "suggested-action-machine learner" refers to a machine learner trained to suggest one or more action items based on one or both of terms within a response to a survey question and a survey category for the survey question. In some cases, a suggested-action-machine learner may suggest action items for one or more responses to survey questions from a particular demographic group at a particular time or, alternatively, to survey questions administered at multiple times during a given time period.

A survey-timeframe-machine learner may include, but is not limited to, the following machine-learning models as a basis for training: a convolutional neural network, a feed-forward neural network, a fully convolutional neural network, a linear least squared regression, a logistic regression, an NBSVM, an RNN, an RCNN, or a support vector regression. In certain implementations, the digital survey system 118 uses an RNN that applies natural-language processing to analyze one or both of a response and a corresponding survey question. For example, the RNN may apply natural-language processing to determine an intent of a response and classify a corresponding survey question into a survey category. Additionally, or alternatively, in some embodiments, the suggested-action-machine learner includes unsupervised learning models, including, but not limited to, Autoencoders, Deep Belief Nets, Hierarchical Clustering, or k-means clustering.

Relatedly, as used in this disclosure, the term "suggested action item" refers to an action that addresses a response or responses from a recipient or respondent to a survey question. Additionally, a suggested action item may be an action that addresses one or more responses to survey questions from a particular demographic group at a particular time or, alternatively, to survey questions administered at multiple times during a given time period. For example, a suggested action item may include, but is not limited to, a weekly one-on-one meeting for a group or team (e.g., for a marketing or recruiting department), a suggestion to formulate a teamwork development program for a group or team, or investigate ways to improve communication among members of a group or team. As additional examples, a suggested action item may include a suggested coupon or discount, a suggested follow-up contact (e.g., email, message, phone call, text), a suggested follow-up survey question, a suggested offer for a refund or other form of redemption, or a suggested meeting with a recipient or respondent. A suggested action item may address group responses, group ratings, or group execution of previously suggested action items, such as a suggested action item for an improvement to a working environment, an adjustment to a group's work hours, a disciplinary action (e.g., to a manager or leader), or a reorganization of a department's personnel. Each of these action items aims to address a response, such as a coupon or discount aiming to placate or improve the views of a dissatisfied customer. Relatedly, the term "suggested-training-action item" refers to an action item suggested by a suggested-action-machine learner during training.

As shown in FIG. 7A, the digital survey system 118 inputs one of training responses 702a-702n into the suggested-action-machine learner 704. In a first training iteration, for example, the digital survey system 118 inputs the training response 702a into the suggested-action-machine learner 704. As used in this disclosure, the term "training response" refers to an actual or simulated response or responses to a survey question used for training a suggested-action-machine learner. A training response may take a variety of forms. For instance, in some embodiments, a training response is a textual response to a survey question. By contrast, in some cases, a training response is a selection from multiple-choice answers or a selected item on a graphic or heat map. In some implementations, a training response may be a rating of a product, service, auditory media, or visual media.

As suggested above, each of the training responses 702a-702n correspond to ground-truth-action items 710a-710n. The ground-truth-action items 710a-710n are a form of annotated data. In particular, the ground-truth-action items 710a-710n represent action items taken (or suggested) by an agent, analyst, administrator, expert, or other user to address a training response. For instance, a training response with a textual response of "broken product" may correspond to a ground-truth-action item of a suggested offer for a refund. As another example, a training response with a selected response of "unsatisfied" may correspond to a ground-truth-action item of a suggested coupon or discount. As a further example, a training response indicating a low score to a survey question (e.g., "My manager listens to me") may correspond to a ground-truth-action item of initiating a communications training with a manager or team for the respondent. As yet another example, a training response indicating dissatisfaction with compensation (e.g., relative to peer groups or similarly situated employees) may correspond to a ground-truth-action item of reviewing compensation and benefits for the respondent's department or group.

In some implementations, the suggested-action-machine learner 704 uses ground-truth-action items specific to a demographic or geographic group. In such embodiments, the digital survey system 118 uses such group-specific ground-truth-action items to train the suggested-action-machine learner 704 to determine suggested-training-action items for specific groups. For example, the ground-truth-action items 710a-710n may be suggested discounts, offers, trainings, meetings, initiatives, or any other action item for a group of survey recipients or respondents of a particular age, country or origin, citizenship, educational level, employer, ethnicity, gender, political ideology, political party, school, occupation, or any combination thereof. As another example, the ground-truth-action items 710a-710n may be suggested discounts, offers, trainings, meetings, initiatives, or any other action item for a group of survey recipients or respondents of a particular country, state, or region (e.g., Europe or North America).

As further shown in FIG. 7A, after the digital survey system 118 inputs the training response 702a into the suggested-action-machine learner 704, the suggested-action-machine learner 704 determines a suggested-training-action item for the training response 702a. To determine a suggested-training-action item for the training response 702a, the suggested-action-machine learner 704 may perform one or both of (i) determining response features of the training response 702a and (ii) classifying a survey question corresponding to the training response 702 into a survey category. When determining response features, in some embodiments, the suggested-action-machine learner 704 applies natural-language processing to identify terms within the training response 702a. Additionally, in some cases, the suggested-action-machine learner 704 identifies a user selection from multiple-choice answers in the training response 702a. As a further example, in certain implementations, the suggested-action-machine learner 704 identifies a selection of a rating from the training response 702a.

As just noted, in some embodiments, the suggested-action-machine learner 704 also classifies a survey question corresponding to the training response 702 into a survey category. For instance, the suggested-action-machine learner 704 classifies survey question corresponding to the training response 702 by selecting a survey category from among preselected survey categories. Such survey categories may be more general, such as categories for course surveys, customer surveys, management surveys, product surveys, or employee surveys. Such employee surveys may include, but are not limited to, employee-census surveys, employee-engagement surveys, employee-exit surveys, employee-experience surveys, employee-lifecycle surveys, employee-insight surveys, employee-onboarding, employee-pre-hire surveys, or employee-pulse surveys. Additionally, or alternatively, such survey categories may be more specific, such as categories for course-content surveys, course-teacher surveys, customer-satisfaction surveys, customer-service surveys, management-leadership surveys, management-subordinate surveys, product-comparison surveys, product-quality surveys, employee-feedback surveys, employee-satisfaction surveys, or employee-superior surveys. Such surveys may include questions for specific categories, such as an employee-empowerment category, employee-diversity category, employee-inclusion category, or an employee-engagement category.

Based on one or both of the response features and survey category, the digital survey system 118 uses the suggested-action-machine learner 704 to determine a suggested-training-action item for a training response. As shown in FIG. 7A, for instance, the digital survey system 118 determines the suggested-training-action item 706a for the training response 702a from among suggested-training-action items 706a-706n. The digital survey system 118 determines the suggested-training-action item 706a based on annotated data that associates one or both of response features and survey categories for the training response 702a to suggested action items To determine such suggested-training-action items, in some embodiments, the digital survey system 118 uses an action-item database that maps one or both of response features and survey categories to suggested action items. For example, in certain implementations, the digital survey system 118 maps a response comprising the term "broken product" and a survey category of product survey to a suggested offer for a refund. As another example, in some cases, the digital survey system 118 maps a response comprising a selection of "unsatisfied" and a survey category of employee-satisfaction survey to a suggested meeting with the survey respondent. As yet another example, in certain implementations, the digital survey system 118 maps a response comprising a neutral rating and a survey category of course-content survey to a suggested follow-up question with a more particular question about a course content. By contrast, in some embodiments, the digital survey system 118 maps a response comprising a high rating and a survey category of product-quality survey to a suggested coupon. Additionally, in some cases, the digital survey system 118 maps a response indicating dissatisfaction with compensation and a survey category of job satisfaction to a suggested review of compensation and benefits for the respondent's department or group. Further, in certain implementations, the digital survey system 118 maps a response indicating a lower score for management's attentiveness to a suggested communications training with a manager or team for the respondent. In some embodiments, the action-item database maps other data to suggested action items, such as by mapping some or all of responses over a given time period or completion of previously suggested action items to suggested action items.

As further indicated by FIG. 7A, in addition to determining a suggested-training-action item, the digital survey system 118 compares the suggested-training-action item 706*a* to a ground-truth-action item 710*a*. As noted above, the training response 702*a* corresponds to the ground-truth-action item 710*a*. In general, the digital survey system 118 compares suggested-training-action items and ground-truth-action items as a basis for adjusting the machine-learning parameters of the suggested-action-machine learner 704. Accordingly, the digital survey system 118 uses ground-truth-action items as reference points to measure the accuracy with which the survey-timeframe-machine learner 510 determines suggested-training-action items.

In some embodiments, the digital survey system 118 uses a loss function 708 to compare suggested-training-action items and ground-truth-action items. When doing so, the digital survey system 118 may use a variety of loss functions as a means of comparison, including, but not limited to, mean squared error, mean squared logarithmic error, mean absolute error, cross entropy loss, negative logarithmic likelihood loss, or L2 loss. For example, in some embodiments, the digital survey system 118 uses a cross-entropy-loss function or a mean-squared-error function as the loss function 708 when using an RNN to determine suggested-training-action items.

As suggested above, in some embodiments, the digital survey system 118 adjusts machine-learning parameters of the suggested-action-machine learner 704 based on the loss determined from the loss function 708. For instance, in some cases, the digital survey system 118 adjusts the machine-learning parameters based on an object to decrease (or increase) a loss in a subsequent training iteration—depending on whether the loss is viewed as a positive or negative. By incrementally adjusting the machine-learning parameters, the digital survey system 118 improves the accuracy with which the suggested-action-machine learner 704 determines suggested-training-action items when compared to the corresponding ground-truth-action items.

As depicted in FIG. 7A, in some embodiments, the digital survey system 118 iteratively trains the suggested-action-machine learner 704. In particular, the digital survey system 118 runs a training iteration for each of the training responses 702*a*-702*n*. In addition to the training iteration described above for the training response 702*a*, the digital survey system 118 uses the suggested-action-machine learner 704 to determine a suggested-training-action item 706*b* based on one or both of response features and a survey category corresponding to the training response 702*a*. The digital survey system 118 subsequently compares the suggested-training-action item 706*b* to the ground-truth-action item 710*a* by using the loss function 708 and adjusts the machine-learning parameters based on a determined loss. The digital survey system 118 similarly uses the suggested-action-machine learner 704 for each of the training responses up through the training response 702*n* and adjusts the machine-learning parameters in each subsequent iteration.

In addition to the embodiments depicted in FIG. 7A, in some cases, the digital survey system 118 uses alternative inputs and alternative outputs to train a suggested-action-machine learner, such as the suggested-action-machine learner 704 or an additional suggested-action-machine learner 704 separate from the suggested-action-machine learner. For example, in addition (or in the alternative) to using the training responses, in some embodiments, the digital survey system 118 inputs action plans, data indicating the extent to which suggested action plans have been completed or not completed, demographic indicators, favorability deltas, favorability responses, follow-up questions, groups of responses, changes between groups of responses from multiple time periods, measured results from previously suggested action plans, and/or survey questions into a suggested-action-machine learner. By using such alternative inputs, the digital survey system 118 trains the suggested-action-machine learner to output suggested action items or suggested action plans.

For instance, the digital survey system 118 may use annotated training data comprising demographic indicators and a training response as inputs, where the demographic indicators and the training response together correspond to a ground-truth-action item or a ground-truth-action plan. By iteratively inputting demographic indicators and training responses into the suggested-action-machine learner and generating suggested-training-action items or suggested-training-action plans, the digital survey system 118 trains the suggested-action-machine learner to accurately generate suggested-training-action items or suggested-training-action plans that correspond to ground-truth-action items or a ground-truth-action plans, respectively.

As another example, the digital survey system 118 may use annotated training data comprising (i) a first group of training responses and first training-action-item-completion indicators for a first group of survey respondents during a first time period as inputs for a first training iteration and (ii) a second group of training responses and second training-action-item-completion indicators for a second group of survey respondents during a second time period as inputs for a second training iteration. In some embodiments, the training-action-item-completion indicators represent a percentage of suggested action items completed by the first group of survey respondents during the first time period or by the second group of survey respondents during the second time period. Additionally, in some cases, the first group of training responses and first training-action-item-completion indicators may correspond to ground-truth-follow-up-action item(s) for the first group in the first iteration. Similarly, the second group of training responses and second training-action-item-completion indicators may correspond to ground-truth-follow-up-action item(s) for the second group in the second iteration.

In some cases, the digital survey system 118 further uses a training delta indicator representing differences between the first group of training responses and the second group of training responses as inputs for the suggested-action-machine learner, such as a metric indicating a difference in responses based on response averages or top-box scores for individual survey questions or groups of survey questions. For example, in an employee-engagement survey, the digital survey system 118 may group survey questions together to determine an "engagement score" represented as a top-box score or average score using a 5-point Likert scale. In certain embodiments, the digital survey system 118 uses deltas of these scores in response to employee-engagement-survey questions over time as a delta indicator. Over different time periods, the digital survey system 118 may use such delta indicators to recognize differences between a gradual incline in an engagement score versus a sharp decline in an engagement score or other such scores for an employee, customer, manager, or other survey respondent.

By iteratively inputting training responses and training-action-item-completion indicators for groups into the suggested-action-machine learner—and by iteratively generating corresponding suggested-training-follow-up-action items—the digital survey system 118 trains the suggested-action-machine learner to accurately generate suggested-training-follow-up-action items that correspond to ground-truth-follow-up-action items for groups tailored to the group's particular responses and completion of action items. Similarly, by iteratively inputting groups of training responses, groups of training-action-item-completion indicators, and a training delta indicator for the corresponding groups of respondents into the suggested-action-machine learner—and by iteratively generating corresponding suggested-training-follow-up-action items for separate groups—the digital survey system 118 trains the suggested-action-machine learner to accurately generate suggested-training-follow-up-action items that correspond to ground-truth-follow-up-action items for different groups of respondents tailored to the group's particular responses and completion of suggested action items during different time periods.

Figure 7B:
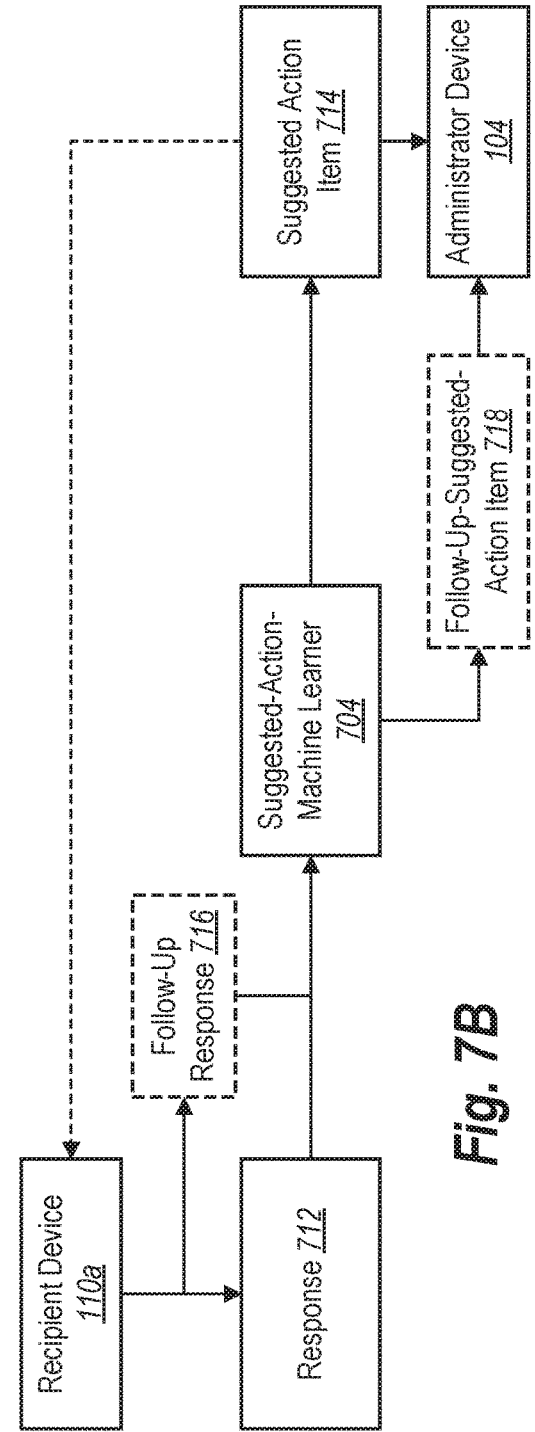
FIG. 7B illustrates a digital survey system using a suggested-action-machine learner to determine a suggested action item for a response to a survey question in accordance with one or more embodiments.

In addition to training the suggested-action-machine learner 704, in some embodiments, the digital survey system 118 applies the suggested-action-machine learner 704 to responses to survey questions from survey recipients. FIG. 7B illustrates the digital survey system 118 using the suggested-action-machine learner 704 to determine a suggested action item 714 for a response 712 to a survey question. In some embodiments, the digital survey system 118 further uses the suggested-action-machine learner 704 to determine a follow-up-suggested-action item 718 for a follow-up response 716 to the suggested action item 714. Consistent with the disclosure above, in certain implementations, the response 712 to a survey question includes a response to initial survey questions and/or to suggested survey questions created or selected by the survey administrator 102.

As shown in FIG. 7B, the recipient device 110a sends an indication of a response 712 to the digital survey system 118. For example, in some cases, the recipient device 110a detects user input by the survey recipient 108a responding to a survey question (e.g., textual input, mouse click, touch gesture). This user input creates or indicates the response 712. The recipient device 110a subsequently sends an indication of the response 712 to the digital survey system 118. As suggested above, the response 712 may come in a variety of formats. For instance, the response 712 may be, but is not limited to, a textual response, a selection from multiple-choice answers, a selected item on a graphic or heat map, or a rating.

After receiving the response 712, the digital survey system 118 uses the suggested-action-machine learner 704 to determine the suggested action item 714 for the response 712. Consistent with the training described above, in some embodiments, the suggested-action-machine learner 704 (i) determines response features of the response 712 and/or (ii) classifies a survey question corresponding to the response 712 into a survey category. The digital survey system 118 further determines the suggested action item 714 based on one or both of the response features of the response 712 and the survey category for the corresponding survey question. For instance, in some embodiments, the digital survey system 118 uses an action-item database to map one or both of the response features of the response 712 and the survey category for the corresponding survey question to the suggested action item 714. Consistent with the training described above, in some implementation, the suggest action item 714 is group specific, such as a suggested action item particular to survey respondents of a demographic or geographic group (e.g., Europeans or North Americans).

As further shown in FIG. 7B, after determining the suggested action item 714 for the response 712, the digital survey system 118 provides the suggested action item 714 (or an option corresponding to the suggested action item 714) to the administrator device 104 for display within a graphical user interface. For example, in certain implementations, the digital survey system 118 provides the administrator device 104 a selectable option to send a coupon, discount, or offer for a refund to the survey recipient 108a for display within a graphical user interface. As another example, in some cases, the digital survey system 118 provides the administrator device 104 a selectable option to schedule a meeting with the survey recipient 108a (e.g., a meeting between a supervisor and subordinate). As yet another example, in certain implementations, the digital survey system 118 provides the administrator device 104 a selectable option to send one or more suggested follow-up questions to the survey recipient 108a.

As further indicated in FIG. 7B, in some implementations, the digital survey system 118 uses the suggested-action-machine learner 704 to generate suggested follow-up action items to address follow-up responses to suggested action items. When generating such suggested follow-up action items, the digital survey system 118 may use the suggested-action-machine learner 704 to address both initial responses to survey questions and follow-up responses to follow-up survey questions in a feedback loop. This feedback loop enables the digital survey system 118 to use the suggested-action-machine learner 704 cyclically with each incoming response or other incoming data inputs.

In FIG. 7B, for instance, the suggested action item 714 optionally comprises a suggested follow-up question for the survey recipient 108a. As indicated by FIG. 7B, the digital survey system 118 sends the suggested follow-up question for the survey recipient 108a to the recipient device 110a. The recipient device 110a detects user input by the survey recipient 108a responding to the follow-up survey question. This user input creates or indicates the follow-up response 716. The recipient device 110a subsequently sends an indication of the follow-up response 716 to the digital survey system 118. Consistent with the training above, the digital survey system 118 uses the suggested-action-machine learner 704 to determine the follow-up-suggested-action item 718 for the follow-up response 716. The digital survey system 118 further provides the follow-up-suggested-action item 718 (or an option corresponding to the follow-up-suggested-action item 718) to the administrator device 104 for display within a graphical user interface.

While FIG. 7B depicts the digital survey system 118 determining and providing suggested action items for a single response at a time, in some embodiments, the digital survey system 118 uses the suggested-action-machine learner 704 to serially or collectively determine suggested action items for multiple responses. In some such embodiments, the digital survey system 118 optionally provides the suggested action items together to the administrator device 104 for display within a graphical user interface. For example, in some embodiments, the digital survey system 118 provides a selectable option to send a coupon, discount, offer for a refund, training suggestion, or meeting suggestion to some survey recipients for display within a graphical user interface, where such survey recipients provide a same or similar response to a survey question (e.g., a subset of survey recipients' response included a same key word or indicate a same rating). As another example, in certain embodiments, the digital survey system 118 provides a selectable option to send one or more suggested follow-up questions to some survey recipients for display within a graphical user interface, where (again) such survey recipients provide a same or similar response to a survey question.

In addition to the embodiments depicted in FIG. 7B, in some cases, the digital survey system 118 uses alternative inputs for a suggested-action-machine learner. For example, in addition (or in the alternative) to using responses, in some embodiments, the digital survey system 118 inputs action plans, data indicating the extent to which suggested action plans have been completed or not completed, demographic indicators, favorability deltas, favorability responses, follow-up questions, groups of responses, changes between groups of responses from multiple time periods, measured results from previously suggested action plans, and/or survey questions into a suggested-action-machine learner. By using such alternative inputs, the digital survey system 118 uses the suggested-action-machine learner to output suggested action items or suggested action plans.

For instance, the digital survey system 118 may input demographic indicators and a response into a suggested-action-machine learner. Based on the demographic indicators and the response, the suggested-action-machine learner generates a suggested-training-action item or suggested-training-action plan for a survey respondent (or group of survey respondents) who correspond to the demographic indicators and who provided the response.

As another example, the digital survey system 118 may input a first group of responses and first action-item-completion indicators for a first group of survey respondents during a first time period and (ii) a second group of responses and second action-item-completion indicators for a second group of survey respondents during a second time period as inputs for a second training iteration. In some embodiments, the action-item-completion indicators represent a percentage of suggested action items completed by the first group of survey respondents during the first time period or by the second group of survey respondents during the second time period. In some cases, the digital survey system 118 further inputs a delta indicator into the suggested-action-machine learner, where the delta indicator represents differences between the first group of responses and the second group of responses, such as a metric indicating a difference in responses based on response averages or top-box scores for individual survey questions or groups of survey questions.

When the digital survey system 118 inputs the first group of responses and first action-item-completion indicators for the first group of survey respondents into the suggested-action-machine learner, for example, the suggested-action-machine learner generates suggested-follow-up-action items specific to the first group of respondent's particular responses and completion of action items. The suggested-action-machine learner can likewise generate suggested-follow-up-action items specific to the second group of respondent's particular responses and completion of action items based on the second group of responses and second action-item-completion indicators. Similarly, when the digital survey system 118 inputs the first group of responses, the first action-item-completion indicators, the second group of responses, the second action-item-completion indicators, and a delta indicator for the corresponding groups of respondents into the suggested-action-machine learner, the suggested-action-machine learner generates suggested-follow-up-action items for the first group of survey respondents and suggested-follow-up-action items for the second group of survey respondents—where each suggested-follow-up-action items are tailored to the group's particular responses and completion of suggested action items during their respective time periods.

Figure 8:
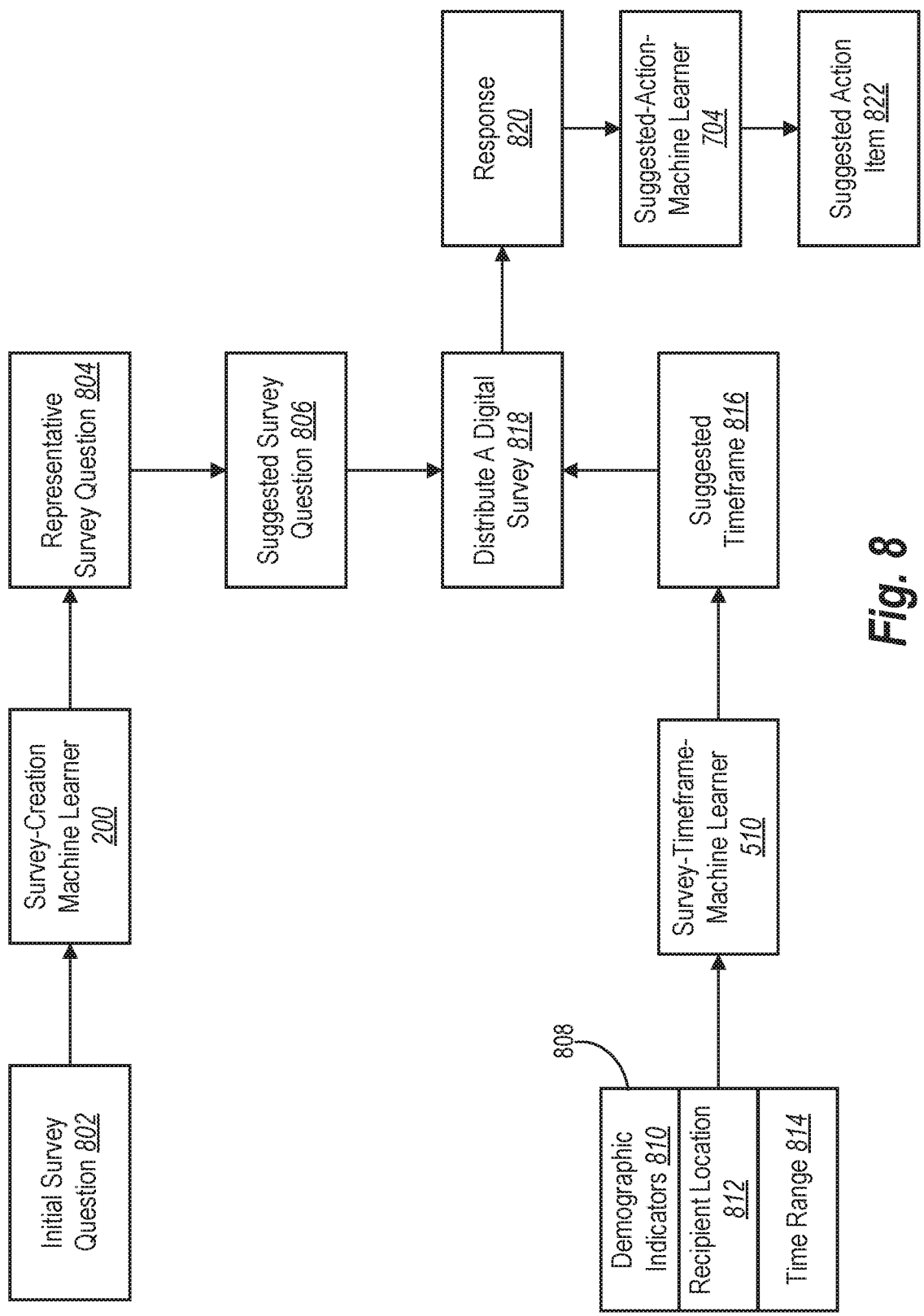
FIG. 8 illustrates a digital survey system using machine learners to determine a suggested survey question, a suggested timeframe in which to send the suggested survey question, and a suggested action item for a response to the suggested survey question in accordance with one or more embodiments.

As suggested above, in addition to using a survey-creation-machine learner, survey-timeframe-machine learner, or suggested-action-machine learner individually, in certain embodiments, the digital survey system 118 uses a survey-creation-machine learner, survey-timeframe-machine learner, and suggested-action-machine learner as part of an integrated system. In some such embodiments, the digital survey system 118 uses a survey-creation-machine learner, survey-timeframe-machine learner, and suggested-action-machine learner to compliment and (in some cases) add to each other's outputs. FIG. 8 depicts an example of the digital survey system 118 using multiple machine learners together. In particular, FIG. 8 illustrates the digital survey system 118 using machine learners to determine a suggested survey question, a suggested timeframe in which to send the suggested survey question, and a suggested action item for a response to the suggested survey question.

As indicated in FIG. 8, the administrator device 104 detects user input from the survey administrator 102 creating an initial survey question 802. The administrator device 104 sends an indication of the initial survey question 802 to the digital survey system 118. Upon receipt, the digital survey system 118 uses the survey-creation-machine learner 200 to identify textual features of the initial survey question 802 and select a representative survey question 804 for the initial survey question 802 based on identified textual features. Based on the representative survey question 804, the digital survey system 118 uses the survey-creation-machine learner 200 to determine a suggested survey question 806.

Although not shown in FIG. 8, in some embodiments, the digital survey system 118 provides the suggested survey question 806 to the administrator device 104 for display within a graphical user interface. The administrator device 104 subsequently detects a selection by the survey administrator 102 of a selectable option to add the suggested survey question 806 to a digital-survey template. The administrator device 104 detects further user inputs from the survey administrator 102 until finishing a draft of a digital survey.

As further indicated by FIG. 8, the administrator device 104 detects user input from the survey administrator 102 creating or selecting recipient indicators 808. As shown, the recipient indicators 808 include demographic indicators 810 for target survey recipients, a recipient location 812 for the target recipients, and a time range 814 in which to send the suggested survey question 806. The administrator device 104 sends the recipient indicators 808 to the digital survey system 118.

Upon receipt, the digital survey system 118 uses the survey-timeframe-machine learner 510 to determine (from within the time range 814) a suggested timeframe 816 in which to send the target survey recipients the suggested survey question 806. In some embodiments, the digital survey system 118 provides a selectable option corresponding to the suggested timeframe 816 to the administrator device 104 for display within an updated graphical user interface. The administrator device 104 subsequently detects a selection by the survey administrator 102 of the selectable option.

As further shown in FIG. 8, the digital survey system 118 distributes a digital survey 818. In this particular embodiment, the digital survey system 118 includes the suggested survey question 806 within the digital survey 818. Based on distribution options selected by the survey administrator 102, the digital survey system 118 further distributes the digital survey 818 to recipient devices of the target survey recipients within the suggested timeframe 816.

In some embodiments, the digital survey system 118 provides the administrator device 104 with distribution options for distributing the digital survey. For example, in certain cases, the digital survey system 118 provides a distribution option for various distribution methods, including, but not limited to, data tags corresponding to emails sent through the digital survey system 118, emails sent through an external email service, a link embedded within one or more websites, a post on one or more social networks, a Short Message Service ("SMS") text, a mobile application, or a scan of a Quick Response ("QR") code. Such distribution options are described further by Guiding Creation of an Electronic Survey, U.S. patent application Ser. No. 14/339,169 (filed Oct. 31, 2016), which is hereby incorporated by reference in its entirety. Based on one such distribution option selected by the survey administrator 102, the digital survey system 118 distributes the digital survey 818.

After distributing the digital survey 818, the digital survey system 118 receives a response 820 from the recipient device 110a to the suggested survey question 806. In some cases, the digital survey system 118 further receives a response from the recipient device 110a to the initial survey question 802. As shown in FIG. 8, the digital survey system 118 uses the suggested-action-machine learner 704 to (i) determine response features of the response 820 and/or (ii) classify the suggested survey question 806 into a survey category. The digital survey system 118 further determines a suggested action item 822 based on one or both of the response features of the response 820 and the survey category for the suggested survey question 806. Although not shown in FIG. 8, the digital survey system 118 further provides the suggested action item 822 (or an option corresponding to the suggested action item 822) to the administrator device 104 for display within an updated graphical user interface.

Figure 9:
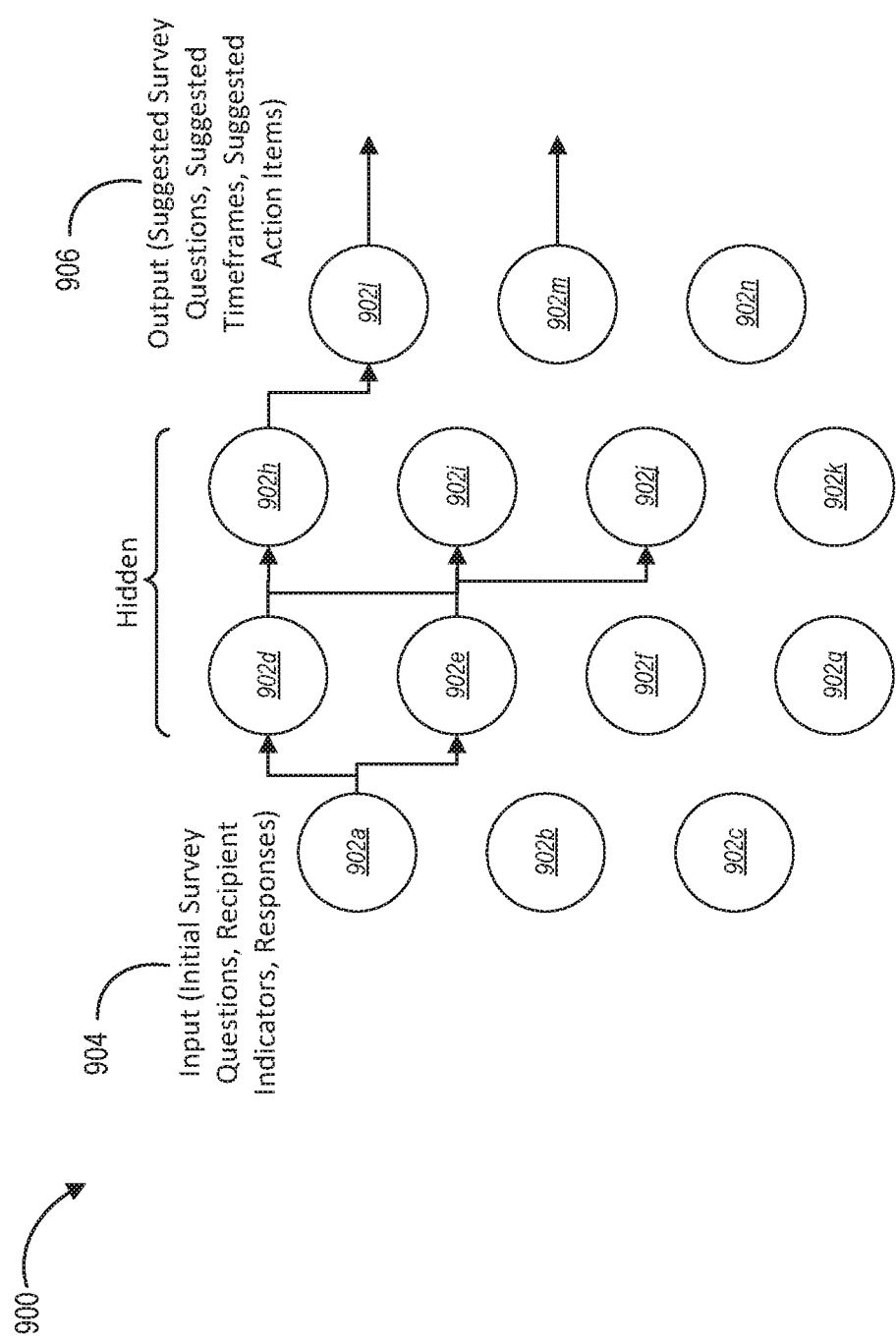
FIG. 9 illustrates a neural network in accordance with one or more embodiments.

Turning now to FIG. 9, this figure depicts an example neural network 900 that the digital survey system 118 uses as the survey-creation-machine learner 200, survey-timeframe-machine learner 510, or the suggested-action-machine learner 704. The neural network 900 comprises nodes 902a-902n that it uses to determine various outputs 906 from various inputs 904. In some such embodiments, the nodes 902a-902c represent an input layer, the nodes 902d-902g represent a first hidden layer, the nodes 902h-902k represent a second hidden layer, and nodes 902l-092n represent an output layer.

As further shown in FIG. 9, the digital survey system 118 provides the inputs 904 to the input layer of the neural network 900. For example, the inputs 904 may include initial survey questions, recipient indicators, or responses. Having received the inputs 904, the neural network 900 uses the first and second hidden layers and the output layer to generate the outputs 906. For instance, the outputs 906 may include suggested survey questions, suggested timeframes, or suggested action items.

As indicated by FIG. 9, the neural network 900 includes various edges among the nodes 902a-902n. For simplicity and purposes of illustration, FIG. 9 depicts only some of the edges that connect the nodes 902a-902n. Among other connections, FIG. 9 depicts edges connecting the node 902a to the nodes 902d and 902e and edges connecting the node 902e to the nodes 902i and 902j. Although not shown, a person having ordinary skill in the art would recognize that the neural network 900 includes edges connecting each of the nodes 902a-902c to each of the nodes 902d-902g; edges connecting each of the nodes 902d-902g to each of the nodes 902h-902k; and edges connecting each of the nodes 902h-902k to each of the nodes 902l-902n. In some implementations, each such edge includes a corresponding weight.

Each of the components of the digital survey system 118 can include software, hardware, or both, including the survey-creation-machine learner 200, survey-timeframe-machine learner 510, and the suggested-action-machine learner 704. For example, the survey-creation-machine learner 200, survey-timeframe-machine learner 510, and the suggested-action-machine learner 704 can include one or more instructions stored on a computer-readable storage medium and executable by processors of one or more computing devices, such as a client device or server device. When executed by the one or more processors, the computer-executable instructions of the digital survey system 118 can cause the computing device(s) to perform the actions, processes, and methods described herein. Alternatively, the survey-creation-machine learner 200, survey-timeframe-machine learner 510, and the suggested-action-machine learner 704 can include hardware, such as a special-purpose processing device to perform a certain function or group of functions. Alternatively, the survey-creation-machine learner 200, survey-timeframe-machine learner 510, and the suggested-action-machine learner 704 of the digital survey system 118 can include a combination of computer-executable instructions and hardware.

Furthermore, the survey-creation-machine learner 200, survey-timeframe-machine learner 510, and the suggested-action-machine learner 704 of the digital survey system 118 may, for example, be implemented as one or more operating systems, as one or more stand-alone applications, as one or more modules of an application, as one or more plug-ins, as one or more library functions or functions that may be called by other applications, and/or as a cloud-computing model. Thus, the survey-creation-machine learner 200, survey-timeframe-machine learner 510, and the suggested-action-machine learner 704 may be implemented as a stand-alone application, such as a desktop or mobile application. Furthermore, the survey-creation-machine learner 200, survey-timeframe-machine learner 510, and the suggested-actionmachine learner 704 may be implemented as one or more web-based applications hosted on a remote server. The survey-creation-machine learner 200, survey-timeframe-machine learner 510, and the suggested-action-machine learner 704 may also be implemented in a suite of mobile device applications or "apps." To illustrate, the survey-creation-machine learner 200, survey-timeframe-machine learner 510, and the suggested-action-machine learner 704 may be implemented in a software application, including but not limited to QUALTRICS® EMPLOYEE EXPERIENCE®, QUALTRICS® EXPERIENCE MGMT®, QUALTRICS® EXPERIENCE MANAGEMENT PLATFORM®, QUALTRICS® SURVEYS, QUALTRICS® INSIGHT PLATFORM®, or QUALTRICS® FOLLOW UP. "QUALTRICS," "EMPLOYEE EXPERIENCE," "EXPERIENCE MGMT," "EXPERIENCE MANAGEMENT PLATFORM," and "INSIGHT PLATFORM" are either registered trademarks or trademarks of Qualtrics, LLC or Qualtrics Labs, Inc. in the United States and/or other countries.

Figure 10:
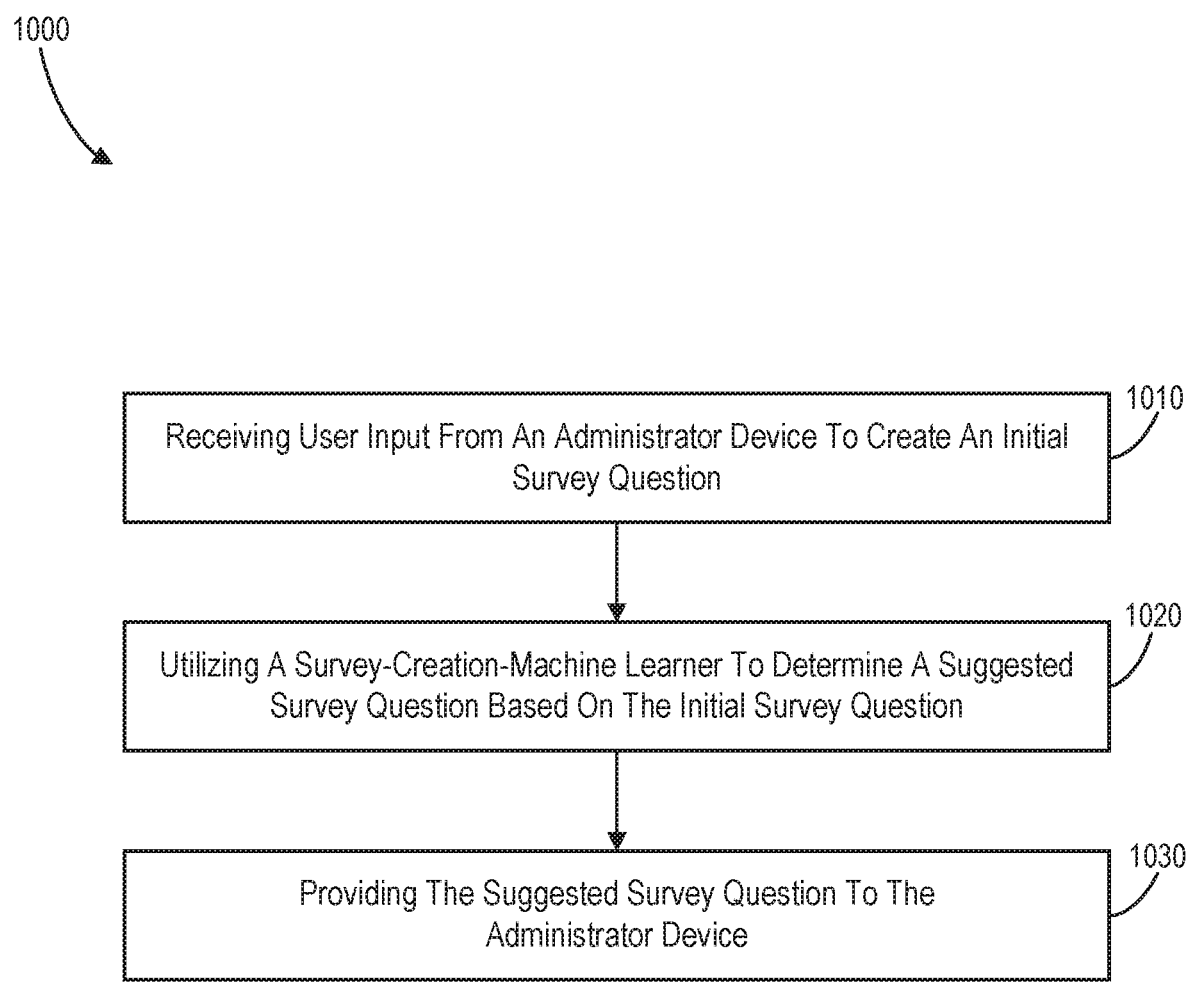
FIG. 10 illustrates a flowchart of a series of acts for using a survey-creation-machine learner to select a representative survey question and to determine a suggested survey question based on textual features of an initial survey question in accordance with one or more embodiments.

Turning now to FIG. 10, this figure illustrates a flowchart of a series of acts 1000 of using a survey-creation-machine learner to select a representative survey question and to determine a suggested survey question based on textual features of an initial survey question in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of receiving user input from an administrator device to create an initial survey question and an act 1020 of utilizing a survey-creation-machine learner to determine a suggested survey question based on the initial survey question. For example, in certain embodiments, the act 1020 includes utilizing a survey-creation-machine learner to identify textual features of the initial survey question, select a representative survey question for the initial survey question based on the identified textual features, and determine a suggested survey question based on the representative survey question. In some such embodiments, the survey-creation-machine learner comprises a recurrent neural network or a Naïve Bayes Support Vector Machine.

As suggested above, in one or more embodiments, utilizing the survey-creation-machine learner to identify the textual features of the initial survey question comprises: extracting terms from the initial survey question; or determining an intent for the initial survey question. Relatedly, utilizing the survey-creation-machine learner to select the representative survey question for the initial survey question comprises: identifying the extracted terms within the representative survey question from among candidate-survey questions; identifying synonymous terms within the representative survey question corresponding to the extracted terms from the initial survey question; or determining that a reciprocal intent of the representative survey question corresponds to the intent of the initial survey question.

As further shown in FIG. 10, the acts 1000 include an act 1030 of providing the suggested survey question to the administrator device. For example, in certain implementations, the act 1030 includes providing the suggested survey question for display within a graphical user interface of the administrator device.

In addition to the acts 1010-1030, in some embodiments, the acts 1000 further include utilizing the survey-creation-machine learner to determine an additional suggested survey question based on the representative survey question, wherein the suggested survey question corresponds to a first survey category and the additional suggested survey question corresponds to a second survey category; and providing a first selectable option for the suggested survey question and a second selectable option for the additional suggested survey question for display within the graphical user interface of the administrator device.

Relatedly, in certain implementations, the acts 1000 further include receiving an indication from the administrator device of a user selection of the first selectable option for the suggested survey question; identifying supplementary suggested survey questions corresponding to the first survey category; and providing the supplementary suggested survey questions for display within an updated graphical user interface of the administrator device.

As further suggested above, the acts 1000 further include, before receiving the user input to create the initial survey question: inputting a training survey question into the survey-creation-machine learner; utilizing the survey-creation-machine learner to: identify training textual features of the training survey question; and select a candidate-representative-survey question for the training survey question based on the identified training textual features; and training the survey-creation-machine learner to select representative survey questions for initial survey questions by comparing the candidate-representative-survey question to a ground-truth-representative-survey question.

Moreover, in some cases, training the survey-creation-machine learner to select the representative survey questions for the initial survey questions comprises: determining a loss from a loss function based on comparing the candidate-representative-survey question to the ground-truth-representative-survey question; and adjusting machine-learning parameters of the survey-creation-machine learner based on an objective to decrease the loss in a subsequent iteration.

As noted above, in some embodiments, the digital survey system 118 uses a survey-timeframe-machine learner to determine suggested timeframes. Accordingly, in some embodiments, the acts 1000 further include receiving from the administrator device demographic indicators for target survey recipients, a recipient location for the target survey recipients, and a time range in which to send the target survey recipients the initial survey question and the suggested survey question; utilizing a survey-timeframe-machine learner to determine from within the time range a suggested timeframe in which to send the initial survey question and the suggested survey question to the target survey recipients, the suggested timeframe corresponding to a highest predicted response rate for the target survey recipients; and providing the suggested timeframe for display within the graphical user interface of the administrator device.

In some such embodiments, utilizing the survey-timeframe-machine learner to determine the suggested timeframe comprises: determining a first response rate for a first survey cluster comprising responses from prior survey recipients who received digital surveys within a first timeframe and who correspond to the demographic indicators and the recipient location for the target survey recipients; determining a second response rate for a second survey cluster comprising responses from prior survey recipients who received digital surveys within a second timeframe and who correspond to the demographic indicators and the recipient location for the target survey recipients; applying a first machine-learning parameter to the first response rate to determine a first weighted response rate; and applying a second machine-learning parameter to the second response rate to determine a second weighted response rate.

Relatedly, in some implementations, utilizing the survey-timeframe-machine learner to determine the suggested timeframe comprises: determining that the first weighted response rate exceeds the second weighted response rate; and selecting a current corollary of the first timeframe as the suggested timeframe based on the first weighted response rate exceeding the second weighted response rate.

Moreover, in one or more cases, the acts 1000 further include, before receiving the demographic indicators, the recipient location, and the time range: inputting into the survey-timeframe-machine learner training demographic indicators for prior survey recipients, a training recipient location for the prior survey recipients, and a training time range in which the prior survey recipients received survey questions; utilizing the survey-timeframe-machine learner to determine from within the training time range a training timeframe for sending the survey questions; training the survey-timeframe-machine learner to determine suggested timeframes for sending suggested survey questions to survey recipients of identified demographic indicators within identified recipient locations by comparing the training timeframe to a ground-truth timeframe for sending the survey questions, the ground-truth timeframe corresponding to a highest recorded response rate for the prior survey recipients.

In some such embodiments, training the survey-timeframe-machine learner to determine the suggested timeframes for sending the suggested survey questions to the survey recipients comprises: determining a loss from a loss function based on comparing the training timeframe to the ground-truth timeframe; and adjusting machine-learning parameters of the survey-timeframe-machine learner based on an objective to decrease the loss in a subsequent iteration.

As noted above, in some embodiments, the digital survey system 118 uses a suggested-action-machine learner to determine suggested action items. Accordingly, in some embodiments, the acts 1000 further include providing the suggested survey question to recipient devices associated with survey recipients; receiving a response to the suggested survey question from a recipient device of the recipient devices; and utilizing a suggested-action-machine learner to determine a suggested action item based on the response. Additionally, in certain implementations, the acts 1000 further include receiving a demographic indicator for a survey recipient who provided the response to the suggested survey question and an action-item-completion indicator indicating that the survey recipient completed or failed to complete the suggested action item; and utilizing an additional suggested-action-machine learner to determine a suggested-follow-up-action item based on the demographic indicator and the action-item-completion indicator.

In some implementations, utilizing the suggested-action-machine learner to determine the suggested action item comprises: determining a suggested follow-up survey question; determining a suggested follow-up contact; determining a suggested meeting with a survey recipient associated with the recipient device; or determining a suggested strategy, tactic, or initiative for a manager or team of the survey recipient associated with the recipient device. Relatedly, in certain embodiments, utilizing the suggested-action-machine learner to determine the suggested action item comprise: applying natural-language processing to identify terms within the response; and determining the suggested action item based on the response and the terms.

Additionally, in certain embodiments, the acts 1000 further include inputting into the suggested-action-machine learner a training response to a survey question from a training survey respondent; utilizing the suggested-action-machine learner to determine a suggested-training-action item based on the training response; and training the suggested-action-machine learner to determine suggested action items for responses by comparing the suggested-training-action item to a ground-truth-action item for the training response. In some such embodiments, train the suggested-action-machine learner to determine the suggested action items for the responses comprises: determining a loss from a loss function based on comparing the suggested-training-action item to the ground-truth-action item for the training response; and adjusting machine-learning parameters of the suggested-action-machine learner based on an objective to decrease the loss in a subsequent iteration.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
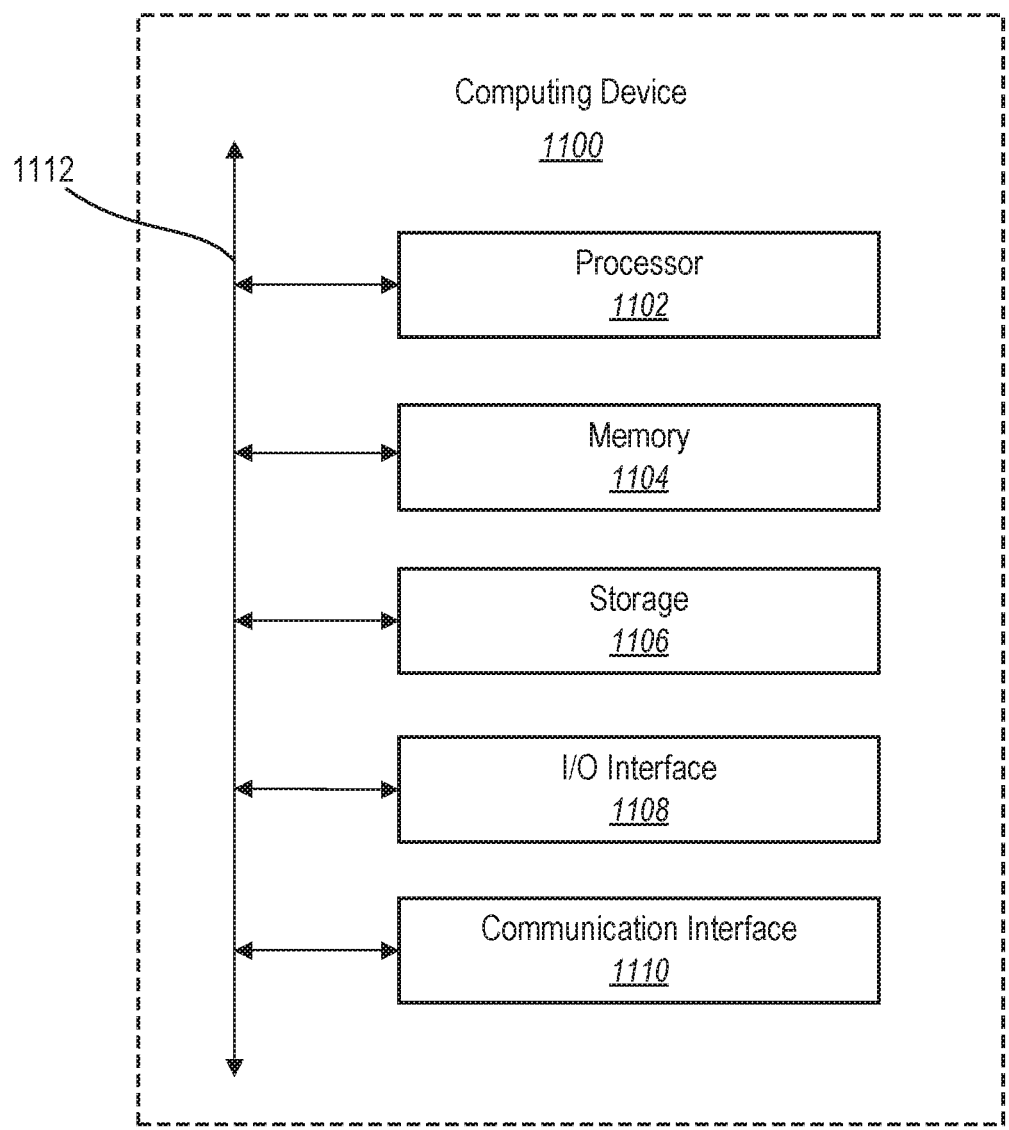
FIG. 11 illustrates a block diagram of a computing device in accordance with one or more embodiments.

FIG. 11 illustrates a block diagram of an exemplary computing device 1100 that may be configured to perform one or more of the processes described above. One will appreciate that one or more computing devices such as the computing device 1100 may implement the administrator device 104, the recipient devices 110a-110n, the server device(s) 116, and/or other devices described above in connection with FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While the exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers ("TLBs"). Instructions in the instruction caches may be copies of instructions in the memory 1104 or the storage device 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive ("HDD"), a floppy disk drive, flash memory, an optical disc, a magneto-optical disc, magnetic tape, or a Universal Serial Bus ("USB") drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1108 allows a user to provide input to, receive output from, and otherwise transfer data to and receive data from the computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1110 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1110 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 12:
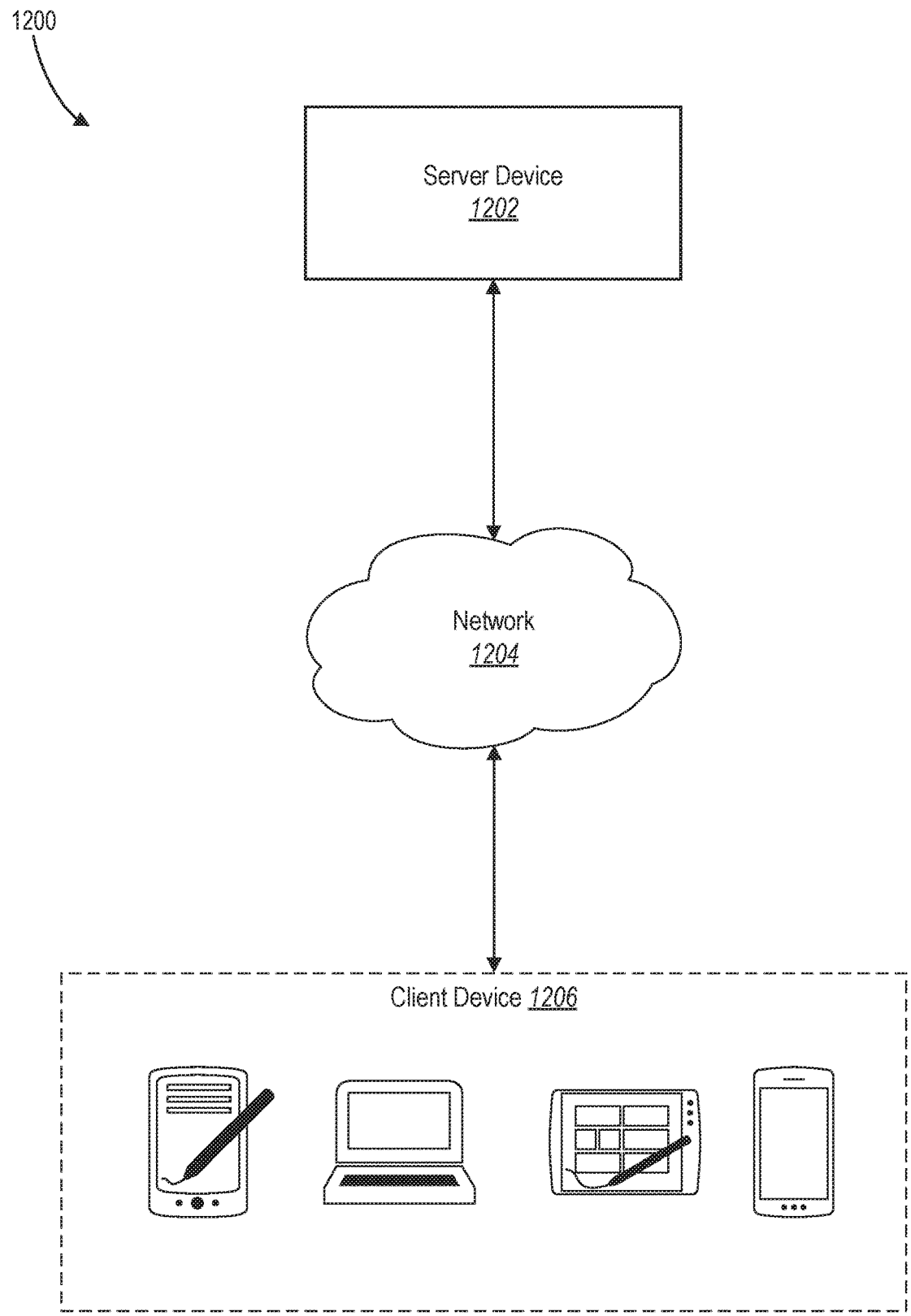
FIG. 12 illustrates a network environment of a digital survey system in accordance with one or more embodiments.

FIG. 12 illustrates an example network environment 1200 of the digital survey system 118. Network environment 1200 includes a client device 1206, and a server device 1202 connected to each other by a network 1204. Although FIG. 12 illustrates a particular arrangement of client device 1206, server device 1202, and network 1204, this disclosure contemplates any suitable arrangement of client device 1206, server device 1202, and network 1204. As an example and not by way of limitation, two or more of the client devices 1206, and server devices 1202 may be connected to each other directly, bypassing network 1204. As another example, two or more of client devices 1206 and server devices 1202 may be physically or logically co-located with each other in whole, or in part. Moreover, although FIG. 12 illustrates a particular number of client devices 1206, server devices 1202, and networks 1204, this disclosure contemplates any suitable number of client devices 1206, server devices 1202, and networks 1204. As an example and not by way of limitation, network environment 1200 may include multiple client devices 1206, server devices 1202, and networks 1204.

This disclosure contemplates any suitable network 1204. As an example and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, and server device 1202 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include any of the computing devices discussed above in relation to FIG. 11. A client device 1206 may enable a network user at client device 1206 to access network 1204.

In particular embodiments, client device 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1206 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1206 one or more Hyper Text Markup Language ("HTML") files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1202 may include a variety of servers, sub-systems, programs, modules, logs, and data stores. In particular embodiments, server device 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1202 may also include suitable components such as network interfaces, security mechanisms, load balancers, failover servers, management-and-network-operations consoles, other suitable components, or any suitable combination thereof.

In particular embodiments, server device 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., users 116a and 116n, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   receiving, from an administrator device and via a survey creation graphical user interface, user input to create an initial survey question;
   inputting the initial survey question into a survey-creation-machine learner to:
      apply natural-language processing to identify textual features of the initial survey question comprising an intent of the initial survey question;
      select a representative survey question for the initial survey question based on the identified textual features comprising the intent of the initial survey question; and
      determine, from a correlation database and based on the representative survey question, a first suggested survey question corresponding to a first survey category and a second suggested survey question corresponding to a second survey category;
   receiving, from the survey-creation-machine learner, the first suggested survey question and the second suggested survey question; and
   providing, for display within the survey creation graphical user interface of the administrator device, a first selectable option for the first suggested survey question and a second selectable option for the second suggested survey question.

2. The method of claim 1, wherein utilizing the survey-creation-machine learner to identify the textual features of the initial survey question comprises:
   extracting terms from the initial survey question; or
   determining an intent for the initial survey question.

3. The method of claim 2, wherein utilizing the survey-creation-machine learner to select the representative survey question for the initial survey question comprises:
   identifying the extracted terms within the representative survey question from among candidate-survey questions;
   identifying synonymous terms within the representative survey question corresponding to the extracted terms from the initial survey question; or
   determining that a reciprocal intent of the representative survey question corresponds to the intent of the initial survey question.

4. The method of claim 1, further comprising:
inputting training survey responses corresponding to a demographic group to a suggested-action-machine learner;
utilizing the suggested-action-machine learner to identify suggested-training-action items for the demographic group;
training the suggested-action-machine learner to select suggested-action items for the demographic group by comparing the suggested-training-action items to ground-truth-action items corresponding to the demographic group; and
utilizing the suggested-action-machine learner to determine a suggested-action item based on a survey response.

5. The method of claim 1, further comprising:
receiving an indication from the administrator device of a user selection of the first selectable option for the first suggested survey question;
identifying supplementary suggested survey questions corresponding to the first survey category; and
providing the supplementary suggested survey questions for display within an updated survey creation graphical user interface of the administrator device.

6. The method of claim 1, further comprising, before receiving the user input to create the initial survey question:
inputting a training survey question into the survey-creation-machine learner;
utilizing the survey-creation-machine learner to:
identify training textual features of the training survey question; and
select a candidate-representative-survey question for the training survey question based on the identified training textual features; and
training the survey-creation-machine learner to select representative survey questions for initial survey questions by comparing the candidate-representative-survey question to a ground-truth-representative-survey question.

7. The method of claim 6, wherein training the survey-creation-machine learner to select the representative survey questions for the initial survey questions comprises:
determining a loss from a loss function based on comparing the candidate-representative-survey question to the ground-truth-representative-survey question; and
adjusting machine-learning parameters of the survey-creation-machine learner based on an objective to decrease the loss in a subsequent iteration.

8. The method of claim 1, wherein the survey-creation-machine learner comprises a recurrent neural network or a Naïve Bayes Support Vector Machine.

9. A system comprising:
at least one processor; and
at least one non-transitory computer readable storage medium storing instructions that, when executed by the at least one processor, cause the system to:
receive, from an administrator device and via a survey creation graphical user interface, user input to create an initial survey question;
utilize a survey-creation-machine learner to:
apply natural-language processing to identify textual features of the initial survey question comprising an intent of the initial survey question;
select a representative survey question for the initial survey question based on the identified textual features comprising the intent of the initial survey question; and
determine, from a correlation database and based on the representative survey question, a first suggested survey question corresponding to a first survey category and a second suggested survey question corresponding to a second survey category;
receive, from the survey-creation-machine learner, the first suggested survey question and the second suggested survey question; and
provide, for display within the survey creation graphical user interface of the administrator device, a first selectable option for the first suggested survey question and a second selectable option for the second suggested survey question.

10. The system of claim 9, further comprising instructions that, when executed by the at least one processor, cause the system to:
receive, from the administrator device, demographic indicators for target survey recipients, a recipient location for the target survey recipients, and a time range in which to send the target survey recipients the initial survey question and the first suggested survey question;
utilize a survey-timeframe-machine learner to determine from within the time range a suggested timeframe in which to send the initial survey question and the first suggested survey question to the target survey recipients, the suggested timeframe corresponding to a highest predicted response rate for the target survey recipients; and
provide the suggested timeframe for display within a graphical user interface of the administrator device.

11. The system of claim 10, further comprising instructions that, when executed by the at least one processor, cause the system to utilize the survey-timeframe-machine learner to determine the suggested timeframe by:
determining a first response rate for a first survey cluster comprising responses from prior survey recipients who received digital surveys within a first timeframe and who correspond to the demographic indicators and the recipient location for the target survey recipients;
determining a second response rate for a second survey cluster comprising responses from prior survey recipients who received digital surveys within a second timeframe and who correspond to the demographic indicators and the recipient location for the target survey recipients;
applying a first machine-learning parameter to the first response rate to determine a first weighted response rate; and
applying a second machine-learning parameter to the second response rate to determine a second weighted response rate.

12. The system of claim 11, further comprising instructions that, when executed by the at least one processor, cause the system to utilize the survey-timeframe-machine learner to determine the suggested timeframe by:
determining that the first weighted response rate exceeds the second weighted response rate; and
selecting a current corollary of the first timeframe as the suggested timeframe based on the first weighted response rate exceeding the second weighted response rate.

13. The system of claim 10, further comprising instructions that, when executed by the at least one processor, cause the system to, before receiving the demographic indicators, the recipient location, and the time range:

input, into the survey-timeframe-machine learner, training demographic indicators for prior survey recipients, a training recipient location for the prior survey recipients, and a training time range in which the prior survey recipients received survey questions;

utilize the survey-timeframe-machine learner to determine from within the training time range a training timeframe for sending the survey questions; and train the survey-timeframe-machine learner to determine suggested timeframes for sending suggested survey questions to survey recipients of identified demographic indicators within identified recipient locations by comparing the training timeframe to a ground-truth timeframe for sending the survey questions, the ground-truth timeframe corresponding to a highest recorded response rate for the prior survey recipients.

14. The system of claim 13, further comprising instructions that, when executed by the at least one processor, cause the system to train the survey-timeframe-machine learner to determine the suggested timeframes for sending the suggested survey questions to the survey recipients by:

determining a loss from a loss function based on comparing the training timeframe to the ground-truth timeframe; and adjusting machine-learning parameters of the survey-timeframe-machine learner based on an objective to decrease the loss in a subsequent iteration.

15. A non-transitory computer readable medium storing instructions thereon that, when executed by at least one processor, cause a computing system to:

receive, from an administrator device and via a survey creation graphical user interface, user input to create an initial survey question;

utilize a survey-creation-machine learner to:

apply natural-language processing to identify textual features of the initial survey question comprising an intent of the initial survey question;

select a representative survey question for the initial survey question based on the identified textual features comprising the intent of the initial survey question; and determine, from a correlation database and based on the representative survey question, a first suggested survey question corresponding to a first survey category and a second suggested survey question corresponding to a second survey category;

receive, from the survey-creation-machine learner, the first suggested survey question and the second suggested survey question; and provide for display within the survey creation graphical user interface of the administrator device, a first selectable option for the first suggested survey question and a second selectable option for the second suggested survey question.

16. The non-transitory computer readable medium of claim 15, further comprising instructions that, when executed by the at least one processor, cause the computing system to:

provide the first suggested survey question to recipient devices associated with survey recipients;

receive a response to the first suggested survey question from a recipient device of the recipient devices; and utilize a suggested-action-machine learner to determine a suggested action item based on the response.

17. The non-transitory computer readable medium of claim 16, further comprising instructions that, when executed by the at least one processor, cause the computing system to utilize the suggested-action-machine learner to determine the suggested action item by:

determining a suggested follow-up survey question;

determining a suggested follow-up contact;

determining a suggested meeting with a survey recipient associated with the recipient device; or determining a suggested strategy, tactic, or initiative for a manager or team of the survey recipient associated with the recipient device.

18. The non-transitory computer readable medium of claim 16, further comprising instructions that, when executed by the at least one processor, cause the computing system to utilize the suggested-action-machine learner to determine the suggested action item by:

applying natural-language processing to identify terms within the response; and determining the suggested action item based on the response and the terms.

19. The non-transitory computer readable medium of claim 16, further comprising instructions that, when executed by the at least one processor, cause the computing system to, before receipt of the user input to create the initial survey question:

input, into the suggested-action-machine learner, a training response to a survey question from a training survey respondent;

utilize the suggested-action-machine learner to determine a suggested-training-action item based on the training response; and train the suggested-action-machine learner to determine suggested action items for responses by determining a loss from a loss function based on comparing the suggested-training-action item to a ground-truth-action item for the training response and adjusting machine-learning parameters of the suggested-action-machine learner based on an object to decrease the loss in a subsequent iteration.

20. The non-transitory computer readable medium of claim 16, further comprising instructions that, when executed by the at least one processor, cause the computing system to:

receive a demographic indicator for a survey recipient who provided the response to the first suggested survey question and an action-item-completion indicator indicating that the survey recipient completed or failed to complete the suggested action item; and utilize an additional suggested-action-machine learner to determine a suggested-follow-up-action item based on the demographic indicator and the action-item-completion indicator.

* * * * *